United States Patent

Sasagawa et al.

[19]

[11] Patent Number: 6,028,863
[45] Date of Patent: Feb. 22, 2000

[54] METHOD AND APPARATUS FOR NEGOTIATING CONNECTION IDENTIFIER

[75] Inventors: Yasushi Sasagawa, Kanagawa; Hiroomi Shinha, Nagoya, both of Japan

[73] Assignee: Fujitsu Limited, Kanagawa, Japan

[21] Appl. No.: 08/810,415

[22] Filed: Mar. 4, 1997

[30] Foreign Application Priority Data

Jun. 10, 1996 [JP] Japan .................................. 8-147690

[51] Int. Cl.[7] .................................................. H04L 12/56
[52] U.S. Cl. ........................................... 370/399; 370/462
[58] Field of Search ................................... 370/395–399, 370/401, 409, 410, 465, 466, 467, 462, 463

[56] References Cited

U.S. PATENT DOCUMENTS

| 5,485,455 | 1/1996 | Dobbins et al. | 370/409 |
|---|---|---|---|
| 5,506,847 | 4/1996 | Shobatake | 370/408 |
| 5,684,800 | 11/1997 | Dobbins et al. | 370/401 |
| 5,790,546 | 8/1998 | Dobbins et al. | 370/400 |
| 5,825,772 | 10/1998 | Dobbins et al. | 370/410 |

*Primary Examiner*—Min Jung
*Attorney, Agent, or Firm*—Helfgott & Karas, PC.

[57] ABSTRACT

A device at the terminal unit and a device at the network support an interim local management (ILMI) protocol. When the power is applied to the device at the terminal unit, it notifies the device at the network of support range information about a VPI/VCI of the device at the terminal unit. The device at the network assigns a VPI/VCI to the device at the terminal unit according to the support range information about the VPI/VCI received in a cold start trap message from the device at the terminal unit when a signal is received from the device at the terminal unit.

16 Claims, 45 Drawing Sheets

| BITS | | | | | | | | |
|---|---|---|---|---|---|---|---|---|
| 8 | 7 | 6 | 5 | 4 | 3 | 2 | 1 | |
| CONNECTION IDENTIFIER | | | | | | | | 1 |
| 0 | 1 | 0 | 1 | 1 | 0 | 1 | 0 | |
| INFORMATION ELEMENT IDENTIFIER | | | | | | | | |
| 1 EXT | CODING STANDARD | | IE INSTRUCTION FIELD | | | | | 2 |
| LENGTH OF CONNECTION IDENTIFIER CONTENTS | | | | | | | | 3 - 4 |
| LENGTH OF CONNECTION IDENTIFIER CONTENTS (CONTINUED) | | | | | | | | |
| 1 EXT | 0 SPARE | 0 | VP ASSOCIATED SIGNALING | | PREFERRED/EXCLUSIVE | | | 5 |
| VIRTUAL PATH CONNECTION IDENTIFIER | | | | | | | | 6 - 7 |
| VIRTUAL CHANNEL IDENTIFIER | | | | | | | | 8 - 9 |

PREFERRED/EXCLUSIVE : INVARIABLE INDICATION
   000 : INVARIABLE VPCI; INVARIABLE VCI
   001 : INVARIABLE VPCI; VARIABLE VCI
  OTHERS : RESERVED

VIRTUAL PATH CONNECTION IDENTIFIER : VIRTUAL PATH CONNECTION
                                                      IDENTIFIER
  0 ~ 65535 : CODES INDICATING VIRTUAL PATH CONNECTION IDENTIFIER

VIRTUAL CHANNEL IDENTIFIER : VIRTUAL CHANNEL IDENTIFIER
   0 ~ 31   : UNUSED IN ON-DEMAND USER PLAIN CONNECTION
  32 ~ 65535 : VIRTUAL CHANNEL IDENTIFIER

FIG. 3
PRIOR ART

| MIB | | SYNTAX | AC | REMARKS |
|---|---|---|---|---|
| atmInterfaceConfTable | | | | |
| | atmInterfaceConfEntry | | | |
| | atmInterfaceMaxActiveVpiBits | INTEGER | r- | MAXIMUM BIT LENGTH OF SUPPORTED VPI VALUE |
| | atmInterfaceMaxActiveVciBits | INTEGER | r- | MAXIMUM BIT LENGTH OF SUPPORTED VCI VALUE |

FIG. 19

| MIB | | SYNTAX | AC | REMARKS |
|---|---|---|---|---|
| atmInterfaceConfTable | | | | |
| atmInterfaceConfEntry | | | | |
| | atmInterfaceMaxActiveVpiValue | INTEGER | r- | MAXIMUM SUPPORTED VPI VALUE |
| | atmInterfaceMinActiveVpiValue | INTEGER | r- | MINIMUM SUPPORTED VPI VALUE |
| | atmInterfaceMaxActiveVciValue | INTEGER | r- | MAXIMUM SUPPORTED VCI VALUE |
| | atmInterfaceMinActiveVciValue | INTEGER | r- | MINIMUM SUPPORTED VCI VALUE |

FIG. 20

| SNMP MESSAGE NAME | MEANING |
|---|---|
| GET-REQUEST | REQUEST TO COLLECT MANAGEMENT INFORMATION |
| GET-NEXT-REQUEST | REQUEST TO COLLECT NEXT MANAGEMENT INFORMATION |
| SET-REQUEST | REQUEST TO CHANGE MANAGEMENT INFORMATION |
| GET-RESPONSE | RESPONSE TO REQUEST-PDU |
| TRAP | NOTIFICATION OF EXCEPTION EVENT (INCLUDING COLD START TRAP) |

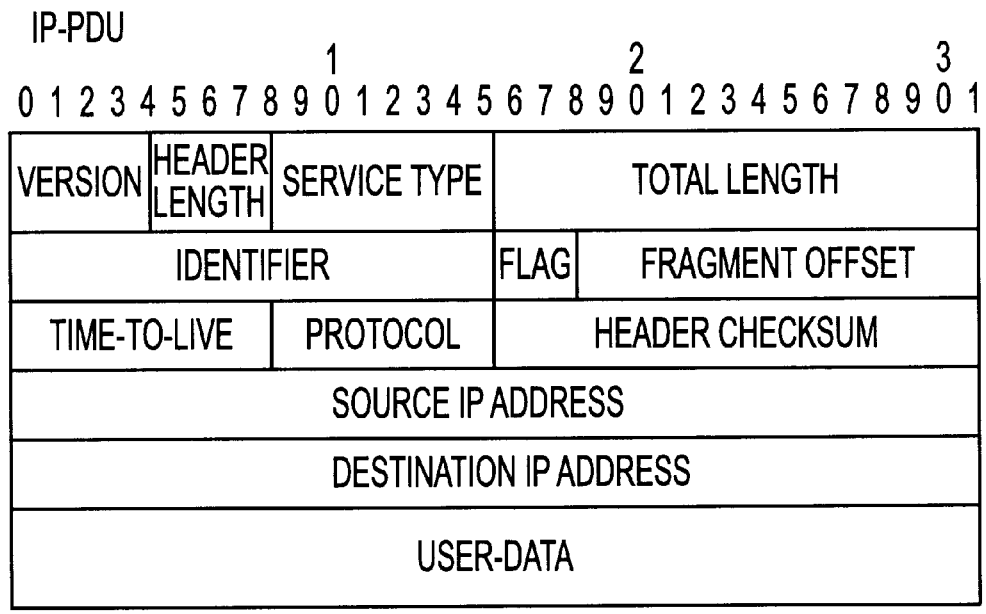

```
IP-PDU                1                   2                   3
0 1 2 3 4 5 6 7 8 9 0 1 2 3 4 5 6 7 8 9 0 1 2 3 4 5 6 7 8 9 0 1
```

| VERSION | HEADER LENGTH | SERVICE TYPE | TOTAL LENGTH | | |
|---|---|---|---|---|---|
| IDENTIFIER | | | FLAG | FRAGMENT OFFSET | |
| TIME-TO-LIVE | | PROTOCOL | HEADER CHECKSUM | | |
| SOURCE IP ADDRESS | | | | | |
| DESTINATION IP ADDRESS | | | | | |
| USER-DATA | | | | | |

| | |
|---|---|
| VERSION | : CURRENT FORMAT (4 AT PRESENT) |
| HEADER LENGTH | : LENGTH OF IP HEADER IN 32-BIT-WORD UNITS |
| SERVICE TYPE | : QUALITY OF SERVICE REQUIRED BY DATAGRAM |
| TOTAL LENGTH | : TOTAL LENGTH OF DATAGRAM IN OCTET |
| IDENTIFIER | : 16-BIT VALUE ASSIGNED BY SENDER OF DATAGRAM |
| FLAG | : CONTROL BIT FOR USE IN DETERMINING WHETHER OR NOT DATAGRAM CAN BE DIVIDED |
| FRAGMENT OFFSET | : POSITION OF FIRST DATAGRAM WHEN IT IS DIVIDED |
| DURABILITY | : MAXIMUM VALUE OF TIME DURING WHICH DATAGRAM CAN BE PROCESSED IN INTERNET SYSTEM |
| PROTOCOL | : HIGHER ORDER PROTOCOL USING IP (ICMP:1, UDP:17) |
| HEADER CHECKSUM | : ADDITION OF 1'S COMPLEMENT OF IP DATAGRAM HEADER |
| SOURCE IP ADDRESS | : IP ADDRESS OF SOURCE DEVICE |
| DESTINATION IP ADDRESS | : IP ADDRESS OF RECEIVING DEVICE AT DESTINATION |
| USER-DATA | : DATAGRAM HIGHER ORDER PROTOCOL |

FIG. 24

| MIB | SYNTAX | AC | REMARKS |
|---|---|---|---|
| atmfAtmLayerTable | SEQUENCE OF atmfAtmLayerEntry | | |
| atmfAtmLayerEntry<br>\* atmfAtmLayerIndex | AtmfAtmLayerEntry<br>INTEGER | | |
| atmfAtmLayerMaxVpiBits<br>atmfAtmLayerMaxVciBits | INTEGER<br>INTEGER | r<br>r | MAXIMUM BIT LENGTH OF SUPPORTED VPI VALUE<br>MAXIMUM BIT LENGTH OF SUPPORTED VCI VALUE |

FIG. 26

| MIB | SYNTAX | AC | REMARKS |
|---|---|---|---|
| atmfAtmLayerTable | SEQUENCE OF atmfAtmLayerEntry | | |
| atmfAtmLayerEntry | AtmfAtmLayerEntry | | |
| * atmfAtmLayerIndex | INTEGER | | |
| atmfAtmLayerMaxVpiValue | INTEGER | | MAXIMUM SUPPORTED VPI VALUE |
| atmfAtmLayerMinVpiValue | INTEGER | | MINIMUM SUPPORTED VPI VALUE |
| atmfAtmLayerMaxVciValue | INTEGER | | MAXIMUM SUPPORTED VCI VALUE |
| atmfAtmLayerMinVciValue | INTEGER | | MINIMUM SUPPORTED VCI VALUE |

FIG. 27

SET-UP MESSAGE

| INFORMATION ELEMENT | DIRECTION | TYPE | LENGTH |
|---|---|---|---|
| (1) PROTOCOL DISCRIMINATOR | BOTH | M | 1 |
| (2) CALL REFERENCE | BOTH | M | 4 |
| (3) MESSAGE TYPE | BOTH | M | 2 |
| (4) MESSAGE LENGTH | BOTH | M | 2 |
| (5) AAL PARAMETERS | BOTH | O | 4-20 |
| (6) ATM USER CELL RATE | BOTH | M | 12-30 |
| (7) BROADBAND BEARER CAPABILITY | BOTH | M | 6-7 |
| (8) BROADBAND HIGH LAYER INFORMATION | BOTH | O | 4-13 |
| BROADBAND REPEAT INDICATOR | BOTH | O | 4-5 |
| (9) BROADBAND LOW LAYER INFORMATION | BOTH | O | 4-17 |
| (10) CALLED PARTY NUMBER | BOTH | M | 4-25 |
| (11) CALLED PARTY SUBADDRESS | BOTH | O | 4-25 |
| (12) CALLING PARTY NUMBER | BOTH | O | 4-26 |
| (13) CALLING PARTY SUBADDRESS | BOTH | O | 4-25 |
| (14) CONNECTION IDENTIFIER | N→U | M | 9 |
| (15) QoS PARAMETER | BOTH | M | 6 |
| (16) BROADBAND SENDING COMPLETE | BOTH | O | 4-5 |
| (17) TRANSIT NETWORK SELECTION | U→N | O | 4-8 |

TYPE { M: MANDATORY  O: OPTIONAL

FIG. 29

CONNECT MESSAGE

| INFORMATION ELEMENT | DIRECTION | TYPE | LENGTH |
|---|---|---|---|
| (1) PROTOCOL DISCRIMINATOR | BOTH | M | 1 |
| (2) CALL REFERENCE | BOTH | M | 4 |
| (3) MESSAGE TYPE | BOTH | M | 2 |
| (4) MESSAGE LENGTH | BOTH | M | 2 |
| (5) AAL PARAMETERS | BOTH | O | 4-11 |
| (9) BROADBAND LOW LAYER INFORMATION | BOTH | O | 4-17 |
| (14) CONNECTION IDENTIFIER | BOTH | O | 4-9 |

FIG. 30

CALL PROCESSING MESSAGE

SIGNIFICANCE: LOCAL
DIRECTION: BOTH

| INFORMATION ELEMENT | DIRECTION | TYPE | LENGTH |
|---|---|---|---|
| (1) PROTOCOL DISCRIMINATOR | BOTH | M | 1 |
| (2) CALL REFERENCE | BOTH | M | 4 |
| (3) MESSAGE TYPE | BOTH | M | 2 |
| (4) MESSAGE LENGTH | BOTH | M | 2 |
| (14) CONNECTION IDENTIFIER | BOTH | O | 4-9 |

FIG. 31

INFORMATION ELEMENT (1) PROTOCOL DISCRIMINATOR

| 8 | 7 | 6 | 5 | BITS 4 | 3 | 2 | 1 | |
|---|---|---|---|---|---|---|---|---|
| 0 | 0 | 0 | 0 | 1 | 0 | 0 | 1 | 1 |
| Q.9231 USER-NETWORK CALL CONTROL MESSAGES PROTOCOL DISCRIMINATOR | | | | | | | | |

(2) CALL REFERENCE

| 8 | 7 | 6 | 5 | BITS 4 | 3 | 2 | 1 | |
|---|---|---|---|---|---|---|---|---|
| 0 | 0 | 0 | 0 | 0 | 0 | 1 | 1 | 1 |
| | | | | LENGTH OF CALL REFERENCE VALUE (IN OCTETS) | | | | |
| FLAG | CALL REFERENCE VALUE | | | | | | | 2 |
| CALL REFERENCE VALUE (CONTINUED) | | | | | | | | 3 |
| CALL REFERENCE VALUE (CONTINUED) | | | | | | | | 4 |

(3) MESSAGE TYPE

| 8 | 7 | 6 | 5 | BITS 4 | 3 | 2 | 1 | |
|---|---|---|---|---|---|---|---|---|
| MESSAGE TYPE | | | | | | | | 1 |
| 1 EXT | 0 SPARE | 0 | FLAG | 0 SPARE | 0 SPARE | ACTION INDICATOR | | 2 |

(4) MESSAGE LENGTH

| 8 | 7 | 6 | 5 | BITS 4 | 3 | 2 | 1 | |
|---|---|---|---|---|---|---|---|---|
| MESSAGE LENGTH | | | | | | | | 1 |
| MESSAGE LENGTH | | | | | | | | 2 |

FIG. 32

INFORMATION ELEMENT
(5) ATM ADAPTATION LAYER PARAMETERS
    (AAL PARAMETERS)

| 8 | 7 | 6 | 5 | 4 | 3 | 2 | 1 | |
|---|---|---|---|---|---|---|---|---|
| \multicolumn{8}{c|}{ATM ADAPTATION LAYER PARAMETERS INFORMATION ELEMENT IDENTIFIER} | 1 |
| 0 | 1 | 0 | 1 | 1 | 0 | 0 | 0 | |
| 1 EXT | CODING STANDARD | | IE INSTRUCTION FIELD | | | | | 2 |
| LENGTH OF AAL PARAMETERS CONTENTS | | | | | | | | 3 - 4 |
| AAL TYPE | | | | | | | | 5 |
| FURTHER CONTENT DEPENDING UPON AAL TYPE | | | | | | | | 6 |
| SUBTYPE IDENTIFIER | | | | | | | | 6 |
| 1 | 0 | 0 | 0 | 0 | 1 | 0 | 1 | |
| SUBTYPE | | | | | | | | 6.1 |
| CBR RATE IDENTIFIER | | | | | | | | 7 |
| 1 | 0 | 0 | 0 | 0 | 1 | 1 | 0 | |
| CBR RATE | | | | | | | | 7.1 |
| MULTIPLIER IDENTIFIER | | | | | | | | 8 |
| 1 | 0 | 0 | 0 | 0 | 1 | 1 | 1 | |
| MULTIPLIER | | | | | | | | 8.1 - 8.2 |
| CLOCK RECOVERY TYPE IDENTIFIER | | | | | | | | 9 |
| 1 | 0 | 0 | 0 | 1 | 0 | 0 | 0 | |
| CLOCK RECOVERY TYPE | | | | | | | | 9.1 |
| ERROR CORRECTION IDENTIFIER | | | | | | | | 10 |
| 1 | 0 | 0 | 0 | 1 | 0 | 0 | 1 | |
| ERROR CORRECTION | | | | | | | | 10.1 |
| STRUCTURED DATA TRANSFER IDENTIFIER | | | | | | | | 11 |
| 1 | 0 | 0 | 0 | 1 | 0 | 1 | 0 | |
| STRUCTURED DATA TRANSFER | | | | | | | | 11.1 |
| PARTIALLY FILLED CELLS IDENTIFIER | | | | | | | | 12 |
| 1 | 0 | 0 | 0 | 1 | 0 | 1 | 1 | |
| PARTIALLY FILLED CELLS | | | | | | | | 12.1 |

(AAL TYPE 1)

FIG. 33

INFORMATION ELEMENT (6) ATM USER CELL RATE (ATM TRAFFIC DESCRIPTOR)

| 8 | 7 | 6 | BITS 5 | 4 | 3 | 2 | 1 | |
|---|---|---|---|---|---|---|---|---|
| ATM USER CELL RATE | | | | | | | | 1 |
| 0 | 1 | 0 | 1 | 1 | 0 | 0 | 1 | |
| INFORMATION ELEMENT IDENTIFIER | | | | | | | | |
| 1 ext | CODING STANDARD | | IE INSTRUCTION FIELD | | | | | 2 |
| LENGTH OF ATM USER CELL RATE CONTENTS | | | | | | | | 3 - 4 |
| 1 | 0 | 0 | 0 | 0 | 0 | 1 | 0 | 5 |
| FORWARD PEAK CELL RATE IDENTIFIER ( CLP=0 ) | | | | | | | | |
| FORWARD PEAK CELL RATE | | | | | | | | 5.1 - 5.3 |
| 1 | 0 | 0 | 0 | 0 | 0 | 1 | 1 | 6 |
| BACKWARD PEAK CELL RATE IDENTIFIER ( CLP=0 ) | | | | | | | | |
| BACKWARD PEAK CELL RATE | | | | | | | | 6.1 - 6.3 |
| 1 | 0 | 0 | 0 | 0 | 1 | 0 | 0 | 7 |
| FORWARD PEAK CELL RATE IDENTIFIER ( CLP=0÷1 ) | | | | | | | | |
| FORWARD PEAK CELL RATE | | | | | | | | 7.1 - 7.3 |
| 1 | 0 | 0 | 0 | 0 | 1 | 0 | 1 | 8 |
| BACKWARD PEAK CELL RATE IDENTIFIER ( CLP=0÷1 ) | | | | | | | | |
| BACKWARD PEAK CELL RATE | | | | | | | | 8.1 - 8.3 |
| 1 | 0 | 0 | 0 | 1 | 0 | 0 | 0 | 9 |
| FORWARD SUSTAINABLE CELL RATE IDENTIFIER ( CLP=0 ) | | | | | | | | |
| FORWARD SUSTAINABLE CELL RATE | | | | | | | | 9.1 - 9.2 |
| 1 | 0 | 0 | 0 | 1 | 0 | 0 | 1 | 10 |
| BACKWARD SUSTAINABLE CELL RATE IDENTIFIER ( CLP=0 ) | | | | | | | | |
| BACKWARD SUSTAINABLE CELL RATE | | | | | | | | 10.1 - 10.3 |

INFORMATION ELEMENT

| 1 | 0 | 0 | 1 | 0 | 0 | 0 | 0 | 11 |
|---|---|---|---|---|---|---|---|---|
| FORWARD SUSTAINABLE CELL RATE IDENTIFIER ( CLP=0+1 ) ||||||||

| FORWARD SUSTAINABLE CELL RATE | 11.1 – 11.3 |
|---|---|

| 1 | 0 | 0 | 1 | 0 | 0 | 0 | 1 | 12 |
|---|---|---|---|---|---|---|---|---|
| BACKWARD SUSTAINABLE CELL RATE IDENTIFIER ( CLP=0+1 ) ||||||||

| BACKWARD SUSTAINABLE CELL RATE | 12.1 – 12.3 |
|---|---|

| 1 | 0 | 1 | 0 | 0 | 0 | 0 | 0 | 13 |
|---|---|---|---|---|---|---|---|---|
| FORWARD MAXIMUM BURST SIZE IDENTIFIER ( CLP=0 ) ||||||||

| FORWARD MAXIMUM BURST SIZE | 13.1 – 13.3 |
|---|---|

| 1 | 0 | 1 | 0 | 0 | 0 | 0 | 1 | 14 |
|---|---|---|---|---|---|---|---|---|
| BACKWARD MAXIMUM BURST SIZE IDENTIFIER ( CLP=0 ) ||||||||

| BACKWARD MAXIMUM BURST SIZE | 14.1 – 14.3 |
|---|---|

| 1 | 0 | 1 | 1 | 0 | 0 | 0 | 0 | 15 |
|---|---|---|---|---|---|---|---|---|
| FORWARD MAXIMUM BURST SIZE IDENTIFIER ( CLP=0+1 ) ||||||||

| FORWARD MAXIMUM BURST SIZE | 15.1 – 15.3 |
|---|---|

| 1 | 0 | 1 | 1 | 0 | 0 | 0 | 1 | 16 |
|---|---|---|---|---|---|---|---|---|
| BACKWARD MAXIMUM BURST SIZE IDENTIFIER ( CLP=0+1 ) ||||||||

| BACKWARD MAXIMUM BURST SIZE | 16.1 – 16.3 |
|---|---|

| 1 | 0 | 1 | 1 | 1 | 1 | 1 | 0 | 17 |
|---|---|---|---|---|---|---|---|---|
| BEST EFFORT INDICATOR ||||||||

| 1 | 0 | 1 | 1 | 1 | 1 | 1 | 1 | 18 |
|---|---|---|---|---|---|---|---|---|
| TRAFFIC MANAGEMENT OPTIONS IDENTIFIER ||||||||

| 0 | 0 | 0 | 0 | 0 | 0 | 1 | 1 | 19 |
|---|---|---|---|---|---|---|---|---|
| RESERVED |||||| TAGGING BACKWARD | TAGGING FORWARD | |

FIG. 35

INFORMATION ELEMENT
(7) BROADBAND BEARER CAPABILITY

| BITS | | | | | | | | |
|---|---|---|---|---|---|---|---|---|
| 8 | 7 | 6 | 5 | 4 | 3 | 2 | 1 | |
| 0 | 1 | 0 | BROADBAND BEARER CAPABILITY INFORMATION ELEMENT IDENTIFIER | | | | | 1 |
| | | | 1 | 1 | 1 | 1 | 0 | |
| 1 EXT | CODING STANDARD | | IE INSTRUCTION FIELD | | | | | 2 |
| LENGTH OF B-BC CONTENTS | | | | | | | | 3-4 |
| 0/1 EXT | 0 SPARE | 0 | BEARER CLASS | | | | | 5 |
| 1 EXT | 0 SPARE | 0 | TRAFFIC TYPE | | | TIMING REQUIREMENTS | | 5a |
| 1 EXT | SUSCEPTIBILITY TO CLIPPING | | 0 SPARE | 0 | 0 | USER PLANE CONNECTION CONFIGURATION | | 6 |

(8) BROADBAND HIGH LAYER INFORMATION

| BITS | | | | | | | | |
|---|---|---|---|---|---|---|---|---|
| 8 | 7 | 6 | 5 | 4 | 3 | 2 | 1 | |
| 0 | 1 | 0 | BROADBAND HIGH LAYER INFORMATION INFORMATION ELEMENT IDENTIFIER | | | | | 1 |
| | | | 1 | 1 | 1 | 0 | 1 | |
| 1 EXT | CODING STANDARD | | IE INSTRUCTION FIELD | | | | | 2 |
| LENGTH OF B-HLI CONTENTS | | | | | | | | 3-4 |
| 1 EXT | HIGH LAYER INFORMATION TYPE | | | | | | | 5 |
| HIGH LAYER INFORMATION | | | | | | | | 6-13 |

FIG. 36

INFORMATION ELEMENT
(9) BROADBAND LOW LAYER INFORMATION

| 8 | 7 | 6 | BITS 5 | 4 | 3 | 2 | 1 | |
|---|---|---|---|---|---|---|---|---|
| 0 | 1 | 0 | 1 | 1 | 1 | 1 | 1 | 1 |
| \multicolumn{8}{|c|}{BROADBAND LOW LAYER INFORMATION INFORMATION ELEMENT IDENTIFIER} | |
| 1 EXT | \multicolumn{2}{c|}{CODING STANDARD} | \multicolumn{5}{c|}{IE INSTRUCTION FIELD} | 2 |
| \multicolumn{8}{|c|}{LENGTH OF B-LLI CONTENTS} | 3 - 4 |
| 1 EXT | 0 | 1 | \multicolumn{5}{c|}{USER INFORMATION LAYER 1 PROTOCOL} | 5 |
| | \multicolumn{2}{c|}{LAYER 1 ID} | | | | | | |
| 0/1 EXT | 1 | 0 | \multicolumn{5}{c|}{USER INFORMATION LAYER 2 PROTOCOL} | 6 |
| | \multicolumn{2}{c|}{LAYER 2 ID} | | | | | | |
| 0/1 EXT | \multicolumn{2}{c|}{MODE} | 0 | 0 | 0 | \multicolumn{2}{c|}{Q.933 USE} | 6a |
| | | | \multicolumn{3}{c|}{SPARE} | | | |
| 1 EXT | \multicolumn{7}{c|}{WINDOW SIZE (K)} | 6b |
| 1 EXT | \multicolumn{7}{c|}{USER SPECIFIED LAYER 2 PROTOCOL INFORMATION} | 6a |
| 0/1 EXT | 1 | 1 | \multicolumn{5}{c|}{USER INFORMATION LAYER 3 PROTOCOL} | 7 |
| | \multicolumn{2}{c|}{LAYER 3 ID} | | | | | | |
| 0/1 EXT | \multicolumn{2}{c|}{MODE} | 0 | 0 | 0 | 0 | 0 | 7a |
| | | | \multicolumn{5}{c|}{SPARE} | | |
| 0/1 EXT | 0 | 0 | 0 | \multicolumn{4}{c|}{DEFAULT PACKET SIZE} | 7b |
| | \multicolumn{3}{c|}{SPARE} | | | | | |
| 1 EXT | \multicolumn{7}{c|}{PACKET WINDOW SIZE} | 7c |
| 1 EXT | \multicolumn{7}{c|}{USER SPECIFIED LAYER 3 PROTOCOL INFORMATION} | 7a |
| 1 EXT | \multicolumn{7}{c|}{ISO/IEC TR 9577 INITIAL PROTOCOL IDENTIFIER (IPI)} | 7a |
| 1 EXT | IPI (BIT1) | 0 | 0 | 0 | 0 | 0 | 0 | 7b |
| | | \multicolumn{6}{c|}{SPARE} | | |
| 1 EXT | 0 | 0 | 0 | 0 | 0 | 0 | 0 | 8 |
| | \multicolumn{2}{c|}{SNAP ID} | \multicolumn{5}{c|}{SPARE} | | |

INFORMATION ELEMENT

| | |
|---|---|
| OUI OCTET 1 | 8.1 |
| OUI OCTET 2 | 8.2 |
| OUI OCTET 3 | 8.3 |
| PID OCTET 1 | 8.4 |
| PID OCTET 2 | 8.5 |

(10) CALLED PARTY NUMBER

| BITS | | | | | | | | |
|---|---|---|---|---|---|---|---|---|
| 8 | 7 | 6 | 5 | 4 | 3 | 2 | 1 | |
| CALLED PARTY NUMBER INFORMATION ELEMENT IDENTIFIER | | | | | | | | 1 |
| 0 | 1 | 1 | 1 | 0 | 0 | 0 | 0 | |
| 1 EXT | CODING STANDARD | | IE INSTRUCTION FIELD | | | | | 2 |
| LENGTH OF CALLED PARTY NUMBER CONTENTS | | | | | | | | 3-4 |
| 1 EXT | TYPE OF NUMBER | | | ADDRESSING/NUMBERING PLAN IDENTIFICATION | | | | 5 |
| 0 | ADDRESS/NUMBER DIGITS (IA5 CHARACTERS) | | | | | | | 6 |
| NSAP ADDRESS OCTETS | | | | | | | | 6 |

(11) CALLED PARTY SUBADDRESS

| BITS | | | | | | | | |
|---|---|---|---|---|---|---|---|---|
| 8 | 7 | 6 | 5 | 4 | 3 | 2 | 1 | |
| CALLED PARTY SUBADDRESS INFORMATION ELEMENT IDENTIFIER | | | | | | | | 1 |
| 0 | 1 | 1 | 1 | 0 | 0 | 0 | 1 | |
| 1 EXT | CODING STANDARD | | IE INSTRUCTION FIELD | | | | | 2 |
| LENGTH OF CALLED PARTY SUBADDRESS CONTENTS | | | | | | | | 3-4 |
| 1 EXT | TYPE OF SUBADDRESS | | ODD/EVEN INDICATOR | 0 | 0 SPARE | 0 | | 5 |
| SUBADDRESS INFORMATION | | | | | | | | 6 |

FIG. 38

INFORMATION ELEMENT
(12) CALLING PARTY NUMBER

| 8 | 7 | 6 | 5 | 4 | 3 | 2 | 1 | |
|---|---|---|---|---|---|---|---|---|
| CALLING PARTY NUMBER | | | | | | | | 1 |
| 0 | 1 | 1 | 0 | 1 | 1 | 0 | 0 | |
| INFORMATION ELEMENT IDENTIFIER | | | | | | | | |
| 1 EXT | CODING STANDARD | | IE INSTRUCTION FIELD | | | | | 2 |
| LENGTH OF CALLING PARTY NUMBER CONTENTS | | | | | | | | 3-4 |
| 1 EXT | TYPE OF NUMBER | | | ADDRESSING/NUMBERING PLAN IDENTIFICATION | | | | 5 |
| 1 EXT | PRESENTATION INDICATOR | | 0 | 0 | 0 | SCREENING INDICATOR | | 5a |
| 0 | ADDRESS/NUMBER DIGITS (IA5 CHARACTERS) | | | | | | | 6 |
| NSAP ADDRESS OCTETS | | | | | | | | 6 |

(13) CALLED PARTY SUBADDRESS

| 8 | 7 | 6 | 5 | 4 | 3 | 2 | 1 | |
|---|---|---|---|---|---|---|---|---|
| CALLING PARTY SUBADDRESS | | | | | | | | 1 |
| 0 | 1 | 1 | 0 | 1 | 1 | 0 | 1 | |
| INFORMATION ELEMENT IDENTIFIER | | | | | | | | |
| 1 EXT | CODING STANDARD | | IE INSTRUCTION FIELD | | | | | 2 |
| LENGTH OF CALLING PARTY SUBADDRESS CONTENTS | | | | | | | | 3-4 |
| 1 EXT | TYPE OF SUBADDRESS | | ODD/EVEN INDICATOR | 0 | 0 SPARE | | 0 | 5 |
| SUBADDRESS INFORMATION | | | | | | | | 6 |

FIG. 39

INFORMATION ELEMENT
(14) CONNECTION IDENTIFIER

| 8 | 7 | 6 | 5 BITS 4 | 3 | 2 | 1 | |
|---|---|---|---|---|---|---|---|
| colspan=7 | CONNECTION IDENTIFIER | 1 |
| 0 | 1 | 0 | 1 | 1 | 0 | 1 | 0 |
| | INFORMATION ELEMENT IDENTIFIER | |
| 1 EXT | colspan=2 | CODING STANDARD | colspan=4 | IE INSTRUCTION FIELD | 2 |
| colspan=7 | LENGTH OF CONNECTION IDENTIFIER CONTENTS | 3 |
| colspan=7 | LENGTH OF CONNECTION IDENTIFIER CONTENTS (CONTINUED) | 4 |
| 1 EXT | 0 | 0 SPARE | colspan=2 | VP ASSOCIATED SIGNALING | colspan=2 | PREFERRED/ EXCLUSIVE | 5 |
| colspan=7 | VIRTUAL PATH CONNECTION IDENTIFIER | 6 - 7 |
| colspan=7 | VIRTUAL CHANNEL IDENTIFIER | 8 - 9 |

(15) QUALITY OF SERVICE PARAMETER
(QOS PARAMETER)

| 8 | 7 | 6 | 5 BITS 4 | 3 | 2 | 1 | |
|---|---|---|---|---|---|---|---|
| colspan=7 | QUALITY OF SERVICE PARAMETER | 1 |
| 0 | 1 | 0 | 1 | 1 | 1 | 0 | 0 |
| | INFORMATION ELEMENT IDENTIFIER | |
| 1 EXT | colspan=2 | CODING STANDARD | colspan=4 | IE INSTRUCTION FIELD | 2 |
| colspan=7 | LENGTH OF QUALITY OF SERVICE PARAMETER CONTENTS | 3 - 4 |
| colspan=7 | QoS CLASS FORWARD | 5 |
| colspan=7 | QoS CLASS BACKWARD | 6 |

FIG. 40

INFORMATION ELEMENT
(16) BROADBAND SENDING COMPLETE

| BITS | | | | | | | | |
|---|---|---|---|---|---|---|---|---|
| 8 | 7 | 6 | 5 | 4 | 3 | 2 | 1 | |
| BROADBAND SENDING COMPLETE INFORMATION ELEMENT IDENTIFIER ||||||||  |
| 0 | 1 | 1 | 0 | 0 | 0 | 1 | 0 | 1 |
| 1 EXT | CODING STANDARD || IE INSTRUCTION FIELD |||||  2 |
| LENGTH OF BROADBAND SENDING COMPLETE CONTENTS |||||||| 3 – 4 |
| 1 EXT | BROADBAND SENDING COMPLETE INDICATION |||||||  5 |
|  | 0 | 1 | 0 | 0 | 0 | 0 | 1 | |

(17) TRANSIT NETWORK SELECTION

| BITS | | | | | | | | |
|---|---|---|---|---|---|---|---|---|
| 8 | 7 | 6 | 5 | 4 | 3 | 2 | 1 | |
| TRANSIT NETWORK SELECTION INFORMATION ELEMENT IDENTIFIER |||||||| |
| 0 | 1 | 1 | 1 | 1 | 0 | 0 | 0 | 1 |
| 1 EXT | CODING STANDARD || IE INSTRUCTION FIELD |||||  2 |
| LENGTH OF TRANSIT NETWORK SELECTION CONTENTS |||||||| 3 – 4 |
| 1 EXT | TYPE OF NETWORK IDENTIFICATION || NETWORK IDENTIFICATION PLAN ||||| 5 |
| 0 | NETWORK IDENTIFICATION (IA5 CHARACTERS) ||||||| 6 |

FIG. 41

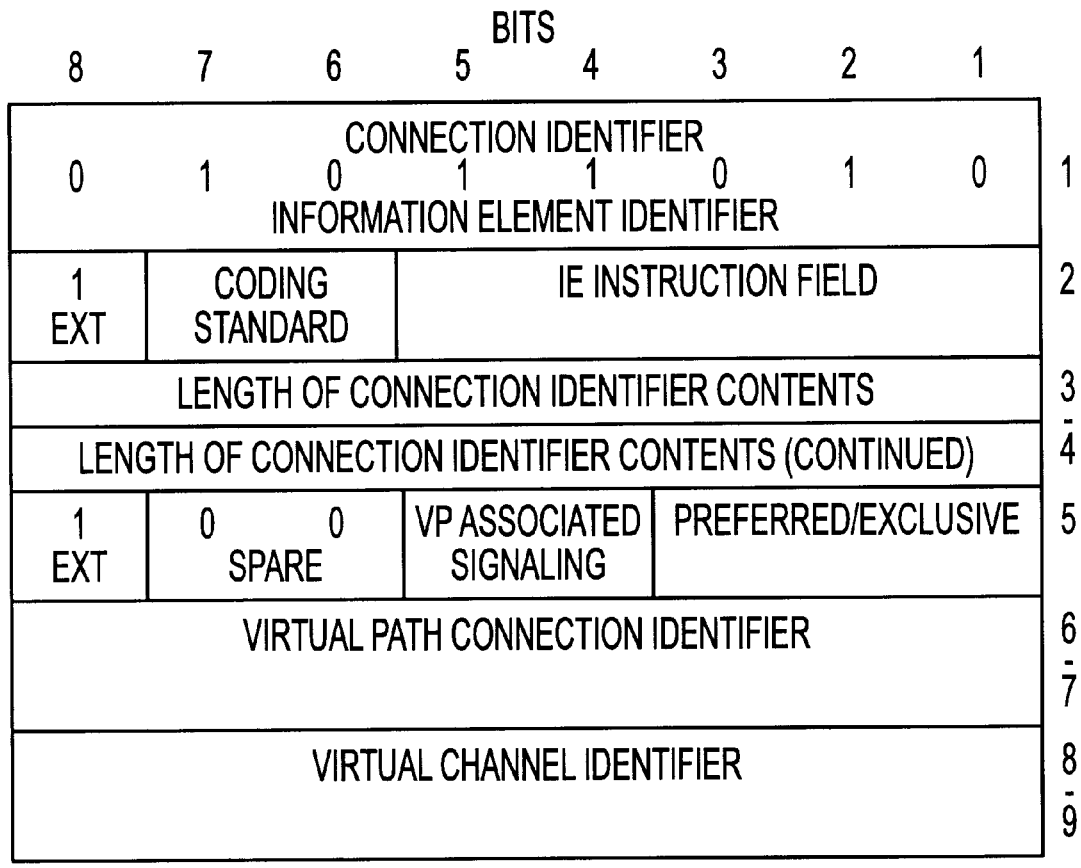

PREFERRED/EXCLUSIVE : INVARIABLE INDICATION
   000 : INVARIABLE VPCI; INVARIABLE VCI
   001 : INVARIABLE VPCI; VARIABLE VCI

| 010 : VARIABLE VPCI; INVARIABLE VCI | ← ADDITION

OTHERS : RESERVED

VIRTUAL PATH CONNECTION IDENTIFIER : VIRTUAL PATH CONNECTION
                                     IDENTIFIER
   0 ~ 65535 : CODES INDICATING VIRTUAL PATH CONNECTION IDENTIFIER

VIRTUAL CHANNEL IDENTIFIER : VIRTUAL CHANNEL IDENTIFIER
   0 ~ 31    : UNUSED IN ON-DEMAND USER PLAIN CONNECTION
   32 ~ 65535 : VIRTUAL CHANNEL IDENTIFIER

FIG. 43
PRIOR ART

METHOD AND APPARATUS FOR NEGOTIATING CONNECTION IDENTIFIER

BACKGROUND OF THE INVENTION

1. Field of the Invention

The present invention relates to technology for negotiating a connection identifier when a signal is issued (when a call connection request is issued) in a switched virtual channel (SVC) service, etc. of an asynchronous transfer mode (ATM) system.

2. Description of the Related Art

The technology for negotiating for a connection identifier when a signal is issued (when a call connection request is issued) in an SVC service, etc. of the ATM system can be one of the following two methods. That is, one method is for determining a connection identifier by a network, and the other method is for determining a connection identifier by a terminal unit.

FIG. 1 shows the conventional sequence in which the connection identifier is determined by the network.

First, a source ATM terminal 1 (A1) sends a request to set up a connection to a signaling unit in terminating equipment (S1).

Next, the source signaling unit sends a SETUP message (call setup message) to a network (S2). In this case, no conditions are specified in the SETUP message for the value of the connection identifier (C-ID).

When the network receives the SETUP message, it determines a connection identifier corresponding to the connection requested by the message, generates another SETUP message which specifies the value of the connection identifier, and sends it to a signaling unit in the terminating equipment at the destination terminal (S3). In response to the SETUP message received from the source terminal, the network returns a CALL-PROCEEDING message (CALL-PROC message) which specifies the value of the above described connection identifier to the signaling unit at the source terminal (S4).

When the signaling unit at the destination terminal receives a SETUP message from the network, it unconditionally accepts the value of the connection identifier specified by the SETUP message, and sends a connection setup notification to a destination ATM terminal 2 (A2) (S5). The signaling unit returns a CONNECT message (answer message) to the network (S6).

When the network receives the CONNECT message from the signaling unit at the destination terminal, it returns a CONN-ACK message (acknowledgement message) to the signaling unit (S7) and returns the CONNECT message to the signaling unit at the source terminal (S8).

When the signaling unit at the source terminal receives the CONNECT message after the CALL-PROC message from the network, it returns the CONN-ACK message to the network (S9). In this case, the signaling unit unconditionally accepts the value of the connection identifier specified by the CALL-PROC message.

As shown in FIG. 1, when the connection identifier is determined by the network, the network completely controls the determination of the connection identifier while the terminal unconditionally accepts the value of the connection identifier determined by the network.

FIG. 2 shows the conventional sequence when the connection identifier is determined by the terminal.

First, the source ATM terminal 1 (A1) sends a request to set up a connection to a signaling unit in a terminating equipment (S1).

Next, the source signaling unit sends a SETUP message (call setup message) in which conditions for the value of a connection identifier (C-ID) are specified to a network (S2).

When the network receives the SETUP message, it determines the value of a connection identifier based on the conditions for the value of the connection identifier specified by the SETUP message, generates another SETUP message which specifies the value of the connection identifier, and sends it to a signaling unit in the terminating equipment at the destination terminal (S3). In response to the SETUP message received from the source terminal, the network returns a CALL-PROCEEDING message (CALL-PROC message) which specifies the value of the above described connection identifier to the signaling unit at the source terminal (S4).

When the signaling unit at the destination terminal receives a SETUP message from the network, it determines whether or not it accepts the value of the connection identifier specified by the SETUP message, and sends a connection setup notification to a destination ATM terminal 2 (A2) (S5). The signaling unit returns a CONNECT message (answer message) to the network (S6). When the signaling unit does not accept the value for the connection identifier specified by the received SETUP message, it specifies an amended value for the connection identifier in the above described CONNECT message.

When the network receives the CONNECT message from the signaling unit at the destination terminal, it returns the CONN-ACK message (acknowledgement message) to the signaling unit (S7) and returns the CONNECT message to the signaling unit at the source terminal (S8).

When the signaling unit at the source terminal receives the CONNECT message after the CALL-PROC message from the network, it returns the CONN-ACK message to the network (S9).

If a connection identifier is determined by the terminal unit as shown in FIG. 2, the conditions for the connection identifier should be determined at the terminal unit.

The limitations on the hardware or software may limit the range of each value of the connection identifier supported by the ATM terminal unit :

virtual path identifier (VPI) and virtual channel identifier (VCI). Practically, the following limitations may be placed.

1. limitation on VPIs only
2. limitation on VCIs only
3. limitation on VPI and VCI These limitations may cause the following problems in the conventional technology.

When a connection identifier is determined by the network as shown in FIG. 1, the network entirely controls the determination of the connection identifier. Therefore, the network should be informed of the limitations on the range of the value of the connection identifier at each ATM terminal unit. Conventionally, it is required that the limitations should be entered off-line for each ATM terminal unit, and the entry operations are complicated and errors can easily be made.

If the connection identifier is determined by the terminal unit as shown in FIG. 2, limitation 2 (on VCIs only) of the above listed three limitations cannot be placed. FIG. 3 shows the data format for use in specifying the connection identifier contained in the conventional signaling message. In FIG. 3, a VPCI (corresponding to the VPI) is stored in the field "virtual path connection identifier", and a VCI is stored in the field "virtual channel identifier". The invariable indication field "preferred/exclusive" contains the following 3-bit values.

000: VPCI is invariable, and VCI is also invariable.

001: VPCI is invariable, but VCI is variable.

Others: reserved values

When the invariable indication field is assigned the value 000 (both VPCI and VCI are invariable), the ATM terminal unit has to manage the use states of both VPCI and VCI. When the invariable indication field is assigned the value 001 (the VPCI is invariable and the VCI is variable), the ATM terminal unit has to manage the use states of the VPCI. In designing the ATM terminal unit, a configuration in which only the VCI has to be managed may be required. However, the conventional technology has the problem that it cannot design an ATM terminal unit to satisfy this requirement.

SUMMARY OF THE INVENTION

The present invention has been developed based on the above described background, and aims at simplifying the entry operation for a connection identifier in an allowed range for each terminal unit when the connection identifier is determined by a network, and at simplifying managing the connection identifier at the terminal unit when the connection identifier is determined by the terminal unit.

The present invention is based on the method of negotiating for a connection identifier identifying the connection set between a device at the terminal unit and a device at the network. The present invention also includes the devices at the terminal unit and the network to realize the functions described below.

The first aspect of the present invention has the following configuration.

The devices at the terminal unit and the network support the communications protocol of a predetermined network management information system.

A device at the terminal unit provides for the device at the network of the support range information about the connection identifier of the device at the terminal unit using a trap message prescribed by the communications protocol, at a predetermined timing.

The device at the network assigns to the device at the terminal unit a connection identifier to be used by the device at the terminal unit according to the support range information about the connection identifier provided from the device at the terminal unit through the trap message.

With the configuration of the first aspect of the present invention, the network is automatically informed of the support range of the connection identifier for the device at the terminal unit at a predetermined timing. Therefore, it is not necessary to enter the limitations of the device at each terminal unit in the device at the network off-line. In the device at the terminal unit, it is not required to carefully manage the connection identifier, thereby reducing the production cost of the device at the terminal unit.

The second aspect of the present invention has the following configuration.

First, devices at the terminal unit and at the network support an interim local management protocol.

When the power is applied to the device at the terminal unit, the device at the terminal unit provides the device at the network with the support range information about the virtual path identifier and virtual channel identifier according to the cold start trap message prescribed by the interim local management protocol.

Next, the device at the network assigns to the device at the terminal unit a virtual path identifier/virtual channel identifier according to the support range information about the virtual path identifier/virtual channel identifier provided by the device at the terminal unit through the cold trap message.

The third aspect of the present invention has the following configuration.

As in the second aspect of the present invention, both devices at the terminal unit and at the network support an interim local management protocol.

When the power is applied to the device at the terminal unit, the device at the terminal unit informs the device at the network of the cold start trap message prescribed by the interim local management protocol.

After receiving a cold start trap message, the device at the network informs the device at the terminal unit of a get request message requesting the support range information about the virtual path identifier/virtual channel identifier of the device at the terminal unit prescribed by the interim local management protocol.

Then, after receiving the get request message, the device at the terminal unit provides the device at the network with the support range information about the virtual path identifier/virtual channel identifier of the device at the terminal unit according to the get response message prescribed by the interim local management protocol.

According to the support range information about the virtual path identifier/virtual channel identifier provided from the device at the terminal unit through the get response message, the device at the network assigns to the device at the terminal unit a virtual path identifier/virtual channel identifier.

With the configuration according to the second and third aspects of the present invention, the support range information about the virtual path identifier/virtual channel identifier of the device at the terminal unit can comprise a message information base indicating the maximum bit length of a virtual path identifier and a message information base indicating the maximum bit length of a virtual channel identifier of the message information bases which are the items to be managed by the interim local management protocol.

The support range information about the virtual path identifier/virtual channel identifier of the device at the terminal unit can comprise a message information base indicating the maximum value of a virtual path identifier, a message information base indicating the minimum value of the virtual path identifier, a message information base indicating the maximum value of a virtual channel identifier, and a message information base indicating the minimum value of the virtual channel identifier of the message information bases which are the items to be managed by the interim local management protocol.

With the configuration according to the above described second or third aspect of the present invention, the network is automatically provided with the support range information about the virtual path identifier/virtual channel identifier of the device at the terminal unit when the power is applied to the device at the terminal unit by only implementing a common interim local management protocol in the devices at the terminal unit and the network. Therefore, it is not required to enter the limitation off-line in the device at the network for each device at the terminal unit.

The fourth aspect of the present invention has the following configuration.

The device at the terminal unit supports the agent function of the simple network management protocol whereas the device at the network is connected in a predetermined procedure to a manager device for supporting the management function of the simple network management protocol.

The device at the terminal unit provides the manager device with the support range information about the virtual path identifier/virtual channel identifier of the device at the terminal unit, when the power is applied to the device at the terminal unit according to the cold start trap message prescribed by the simple network management protocol.

Next, the manager device provides the device at the network in a predetermined procedure with the support range information about the virtual path identifier/virtual channel identifier given by the device at the terminal unit through the cold start trap message.

Then, the device at the network assigns to the device at the terminal unit a virtual path identifier/virtual channel identifier according to the support range information about the virtual path identifier/virtual channel identifier provided by the manager device.

The fifth aspect of the present invention has the following configuration.

First, as in the fourth aspect of the present invention, the device at the terminal unit supports the agent function of the simple network management protocol whereas the device at the network is connected in a predetermined procedure to a manager device for supporting the management function of the simple network management protocol.

When the power is applied to the device at the terminal unit, it informs the manager device of a cold start trap message prescribed by the interim local management protocol.

Then, after receiving the cold start trap message, the manager device informs the device at the terminal unit of a get request message requesting the support range information about the virtual path identifier/virtual channel identifier of the device at the terminal unit prescribed by the interim local management protocol.

After receiving the get request message, the device at the terminal unit provides the manager device with the support range information about the virtual path identifier/virtual channel identifier of the device at the terminal unit according to the get response message prescribed by the interim local management protocol.

Furthermore, the manager device provides, in a predetermined procedure, the device at the network with the support range information about the virtual path identifier/virtual channel identifier provided by the device at the terminal unit through the get response message.

The device at the network assigns to the device at the terminal unit a virtual path identifier/virtual channel identifier according to the support range information about the virtual path identifier/virtual channel identifier provided by the manager device.

With the configuration according to the fourth and fifth aspects of the present invention, the support range information about the virtual path identifier/virtual channel identifier of the device at the terminal unit can comprise a message information base indicating the maximum bit length of a virtual path identifier and a message information base indicating the maximum bit length of a virtual channel identifier of the message information bases which are the items to be managed by the simple network management protocol.

The support range information about the virtual path identifier/virtual channel identifier of the device at the terminal unit can comprise a message information base indicating the maximum value of a virtual path identifier, a message information base indicating the minimum value of the virtual path identifier, a message information base indicating the maximum value of a virtual channel identifier, and a message information base indicating the minimum value of the virtual channel identifier of the message information bases which are the items to be managed by the interim local management protocol.

With the configuration according to the above described fourth or fifth aspect of the present invention, the network is automatically provided with the support range information about the virtual path identifier/virtual channel identifier of the device at the terminal unit when the power is applied to the device at the terminal unit by only implementing a common simple network management protocol in the devices at the terminal unit and the network. Therefore, it is not required to enter the limitation off-line in the device at the network for each device at the terminal unit.

The sixth aspect of the present invention is based on the method in which a device at the terminal unit negotiates with a device at the network for a connection identifier by specifying the condition of the virtual path identifier and virtual channel identifier for identification of the connection set between the device at the terminal unit and the device at the network. The configuration according to the sixth aspect of the present invention is described as follows.

That is, according to the sixth aspect of the present invention, the device at the terminal unit specifies for the device at the network the condition of only the virtual channel identifier without specifying the condition of the virtual path identifier.

With the configuration according to the above described sixth aspect of the present invention, the device at the terminal unit can be designed in response to a request for a configuration in which only a virtual channel identifier should be managed.

BRIEF DESCRIPTION OF THE DRAWINGS

Other objects and features of the present invention are comprehensible to one of ordinary skill in the art by referring to the attached drawings and preferred embodiments of the present invention.

FIG. 3 shows the conventional data format in specifying the connection identifier;

FIG. 19 shows the support range information (1) about the virtual path identifier/virtual channel identifier in the SNMP;

FIG. 20 shows the support range information (2) about the virtual path identifier/virtual channel identifier in the SNMP;

FIG. 24 shows the data format of the IP-PDU;

FIG. 26 shows the support range information (1) about the VPI/VCI in the ILMI;

FIG. 27 shows the support range information (2) about the VPI/VCI in the ILMI;

FIG. 29 shows the data format of the SETUP message;

FIG. 30 shows the data format of the CONNECT message;

FIG. 31 shows the data format of the CALL-PROCEEDING message;

FIG. 32 shows the detailed data configuration of an information element;

FIG. 33 shows the detailed data configuration of an information element;

FIG. 34 shows the detailed data configuration of an information element;

FIG. 35 shows the detailed data configuration of an information element;

FIG. 36 shows the detailed data configuration of an information element;

FIG. 37 shows the detailed data configuration of an information element;

FIG. 38 shows the detailed data configuration of an information element;

FIG. 39 shows the detailed data configuration of an information element;

FIG. 40 shows the detailed data configuration of an information element;

FIG. 41 shows the detailed data configuration of an information element;

FIG. 43 shows the data format for use in specifying a connection identifier according to the fifth embodiment of the present invention;

DESCRIPTION OF THE PREFERRED EMBODIMENTS

The preferred embodiments of the present invention are described below in detail by referring to the attached drawings.

According to some preferred embodiments, the available range of a connection identifier is automatically entered in the network from the terminal unit, when the terminal unit is activated, using a trap message which can be issued by the network management protocol called ILMI or SNMP.

Another embodiment of the present invention is designed such that the VPCI is variable and the VCI is fixed in the data format for use in specifying a connection identifier contained in the signaling message.

Explanation of the Configuration at the Terminal Unit Common to All Embodiments

Figure 4:
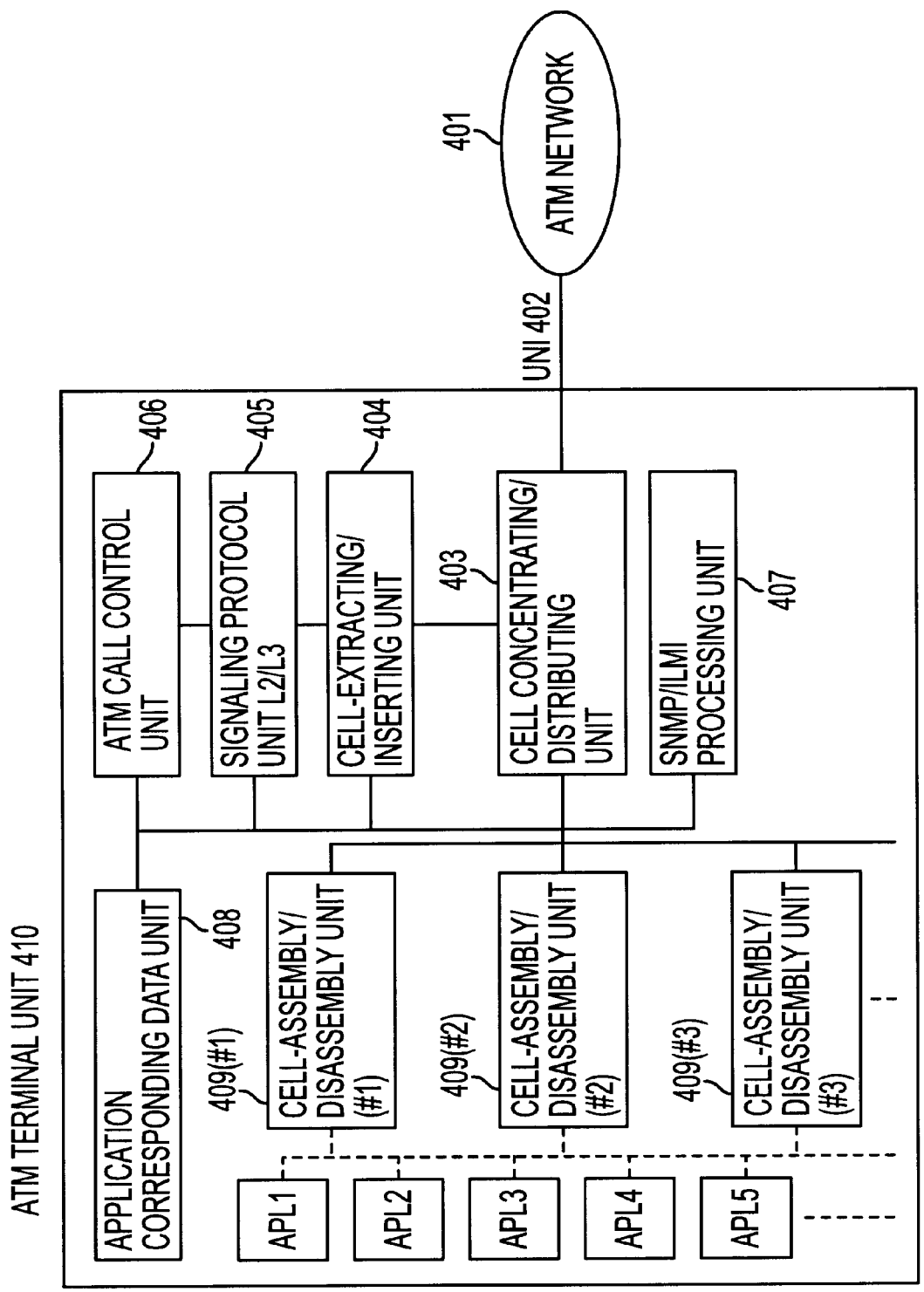
FIG. 4 shows the configuration of an ATM terminal unit common to all preferred embodiments.

FIG. 4 shows the configuration of an ATM terminal unit 410 common to all preferred embodiments.

An ATM call control unit 406 controls issue, acceptance, and disconnection of a calling through the SVC service, and performs a mapping process between the VPI/VCI indicating the virtual line set as a result of the control and each of the applications APL1, APL2, . . . .

A signaling protocol unit 405 terminates a layer 2 (L2) and a layer 3 (L3) of an ATM signaling protocol.

A cell-extracting/inserting unit 404 extracts or inserts a signaling cell.

An application corresponding data unit 408 stores signalling data corresponding to each of the applications APL1, APL2, . . . .

A cell concentrating/distributing unit 403 concentrates cells transmitted from each of the applications APL1, APL2, . . . through each cell-assembly/disassembly unit 409 and sends them to a user/network interface (UNI) 402 connected to an ATM network 401. It distributes a cell received from the UNI 402 to each of the applications APL1, APL2, . . . through each cell-assembly/disassembly unit 409.

Each cell-assembly/disassembly unit 409 divides the data from each of the applications APL1, APL2, . . . into, for example, 48-byte units, generates an ATM cell by adding a 5-byte header to each of the divided data units, transmits it to the cell concentrating/distributing unit 403, reconstructs original data from the ATM cells received from the cell concentrating/distributing unit 403, and transmits the reconstructed data to each of the applications APL1, APL2, . . .

A SNMP/ILMI processing unit 407 terminates an SNMP protocol and ILMI protocol.

With the configuration shown in FIG. 4, the ATM terminal unit 410 is directly connected to the UNI 402 connected to the ATM network 401. According to the present embodiment, a cell assembly/disassembly unit (CLAD) is connected to the UNI 402, and the present embodiment can be applied to the configuration in which a non-ATM terminal unit is connected to the cell assembly/disassembly unit.

Figure 5:
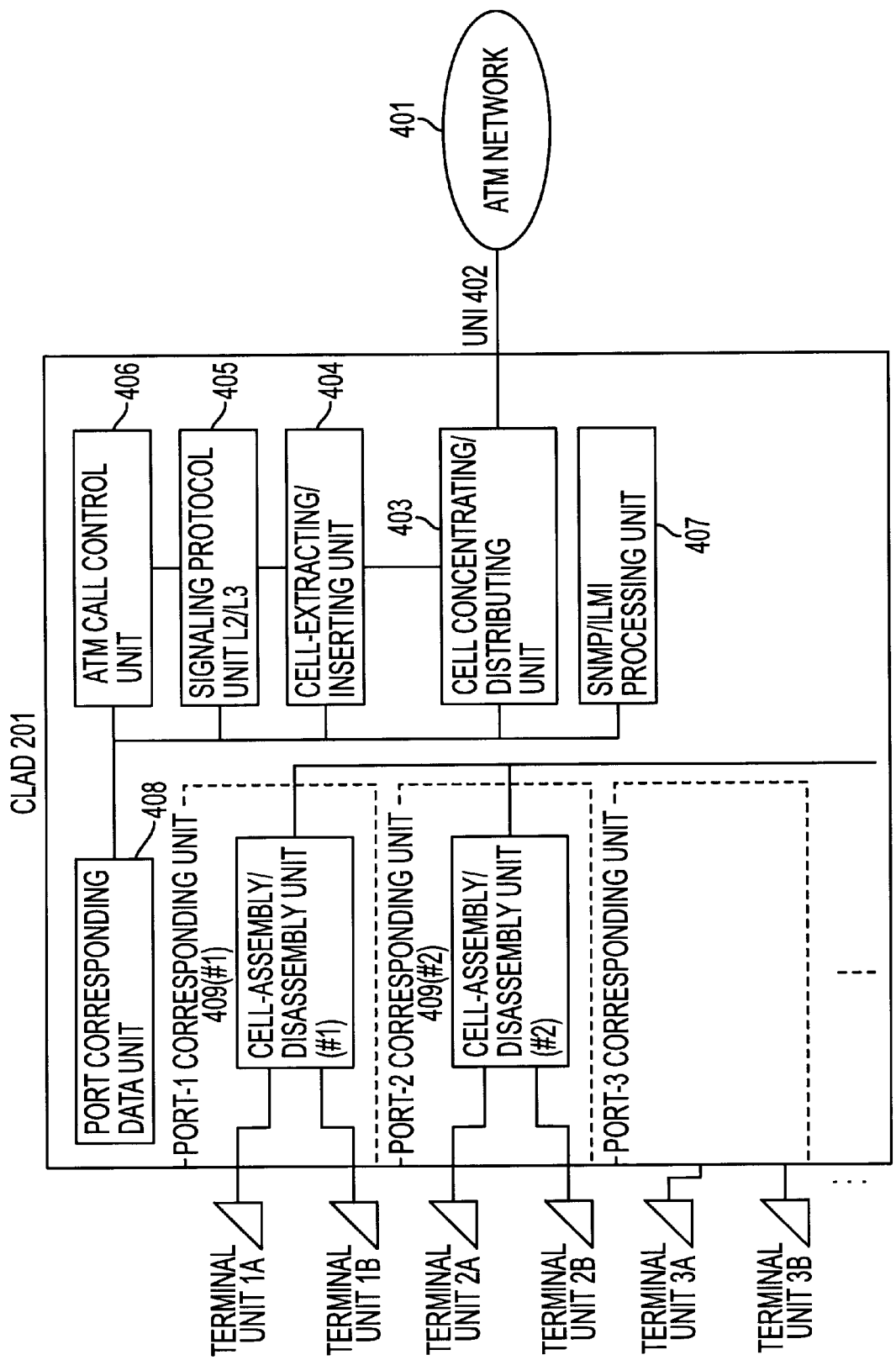
FIG. 5 shows the configuration of the cell assembly-disassembly unit common to all preferred embodiments.

FIG. 5 shows the configuration of a cell-assembly/disassembly device (CLAD) 201. It is different from the ATM terminal unit 410 shown in FIG. 4 in that each application is replaced with the existing terminal unit (non-ATM terminal unit) connected to each port. Each item assigned the same number as shown in FIG. 4 has the same function as that shown in FIG. 4. The port corresponding data unit 408 has practically the same function as the application corresponding data unit 408 shown in FIG. 4. Only the names are different from each other.

Figure 6:
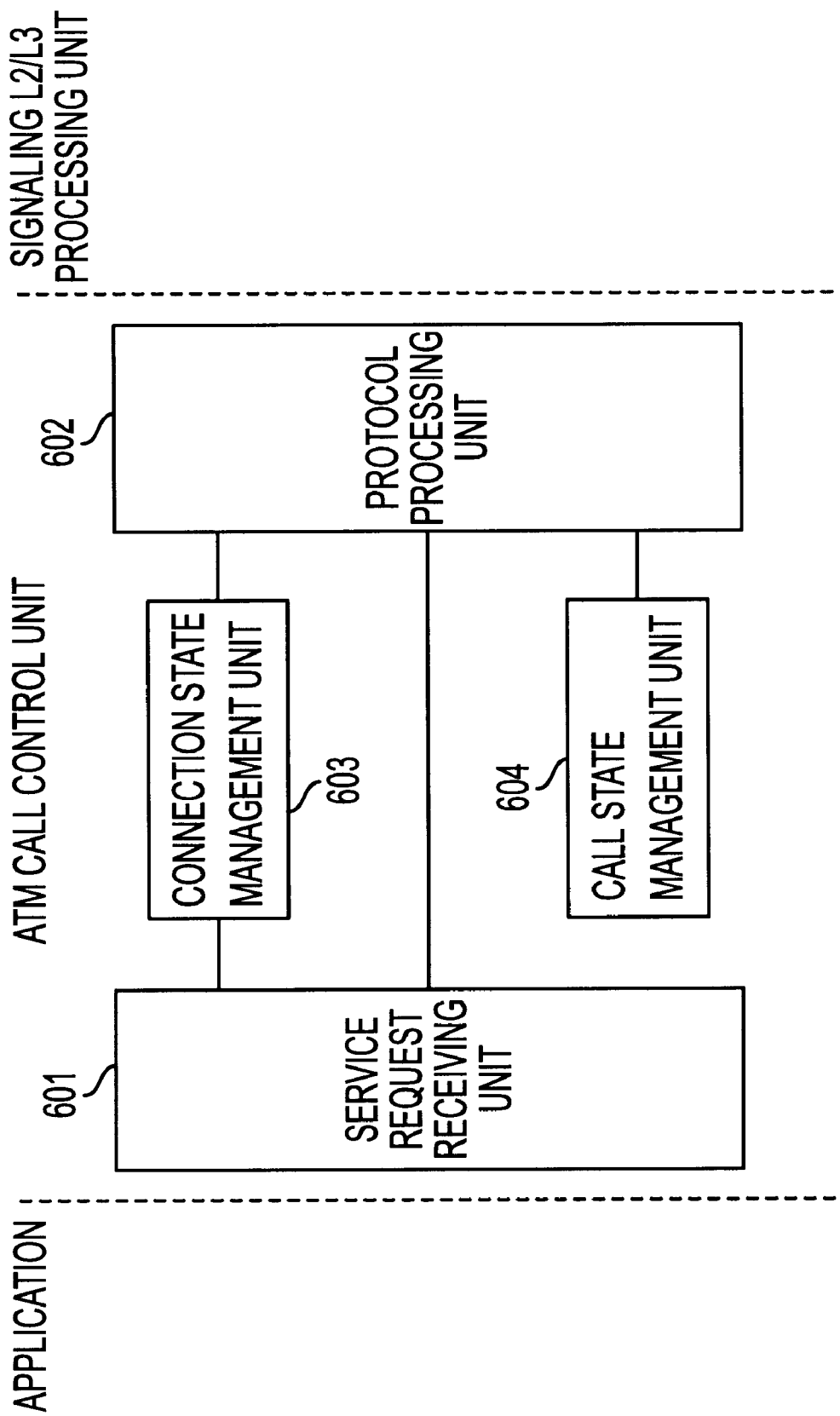
FIG. 6 shows the configuration of the ATM call control unit.

FIG. 6 shows the configuration of the ATM call control unit 406 in the ATM terminal unit 410 shown in FIG. 4 or in the CLAD 201 shown in FIG. 5.

A service request receiving unit 601 establishes an interface with each of the applications APL1, APL2, . . . shown in FIG. 4 or the terminal unit shown in FIG. 5, and provides services such as release, acceptance, and disconnection of a calling for them.

A protocol processing unit 602 establishes an interface with an ATM signaling protocol L3 terminated by the signaling protocol unit 405 shown in FIGS. 4 or 5 and edits/analyzes an ATM signaling L3 message.

A connection state management unit 603 manages the availability and the use state of a VPI/VCI in cooperation with the service request receiving unit 601 and protocol processing unit 602.

A call state management unit 604 manages the state of a calling and a call reference in cooperation with the protocol processing unit 602. The call reference refers to a value identifying the calling during the signaling.

Figure 7:
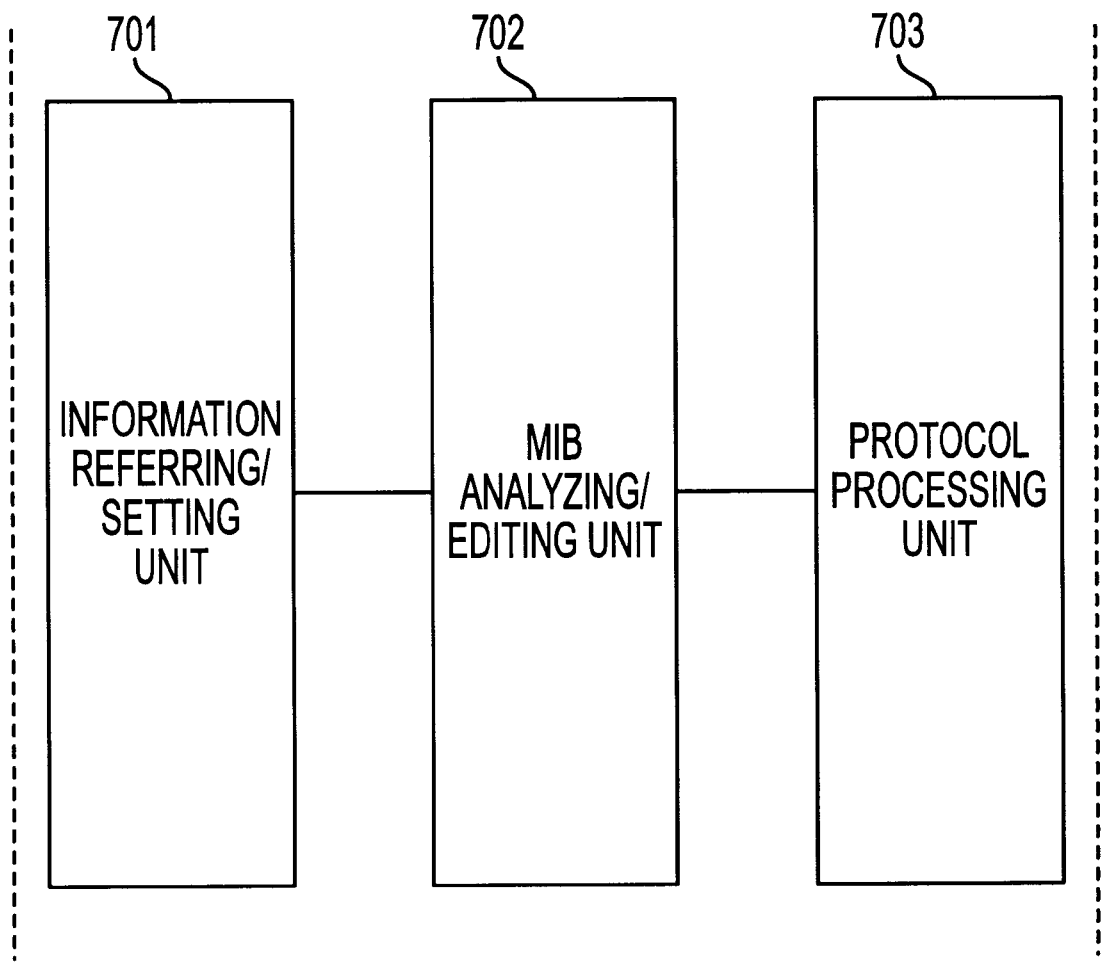
FIG. 7 shows the configuration of the SNMP/ILMI processing unit.

Then, FIG. 7 shows the configuration of the SNMP/ILMI processing unit 407 in the ATM terminal unit 410 shown in FIG. 4 or in the CLAD 201 shown in FIG. 5, and specifically relates to the present invention. A trap message transmitted from a terminal unit to a network when the terminal unit is activated to automatically enter the availability range of a connection identifier to the network from the terminal unit is generated by this unit.

A protocol processing unit 602 terminates either a simple network management protocol (SNMP) or an interim local management interface (ILMI).

An MIB analyzing/editing unit 702 analyzes an object item to be managed, which is received from the ATM network 401 shown in FIG. 4 or 5 through the cell concentrating/distributing unit 403 and cell-extracting/inserting unit 404 and is referred to as a message information base MIB. It also edits the MIB transmitted to the ATM network 401. In the first through fourth embodiments described below, a specific item contained in the MIB and to be managed is used in specifying the availability range of the connection identifier, and the information is transmitted from the terminal unit to the network after including the information in the trap message prescribed in either the SNMP or ILMI, thereby realizing the automatic entry of the availability range of the connection identifier in the network by the terminal unit.

The details of each protocol of the SNMP, ILMI and the MIB are described later in detail.

An information referring/setting unit 701 refers or sets information to be managed by communicating with each unit (not shown in FIG. 7) for managing the information to be managed corresponding to each item to be managed in the MIB.

The preferred embodiments based on the above described configuration are sequentially explained below. Each of the preferred embodiments is applicable to the configurations shown in FIGS. 4 and 5. For easier explanation, the ATM terminal unit 410 is explained on behalf of both ATM terminal unit 410 shown in FIG. 4 and CLAD 201 shown in FIG. 5.

Explanation of the First Preferred Embodiment

The first preferred embodiment of the present invention based on the above described configurations shown in FIGS. 4 through 7 is explained below by referring to the sequence shown in FIG. 8, the flowchart shown in FIG. 9 (process at the terminal unit), and the flowchart shown in FIG. 10 (process at the network).

According to the first preferred embodiment, the terminal unit automatically provides the network with the support range about the VPI/VCI using the cold start trap message by the ILMI when the power is applied to the terminal unit.

First, the SNMP/ILMI processing unit 407 in the ATM terminal unit 410 terminates an ILMI protocol. Hereinafter, the SNMP/ILMI processing unit 407 is referred to as an ILMI processing unit 407. The ILMI is described later in detail by referring to FIGS. 25 through 28.

Figure 8:
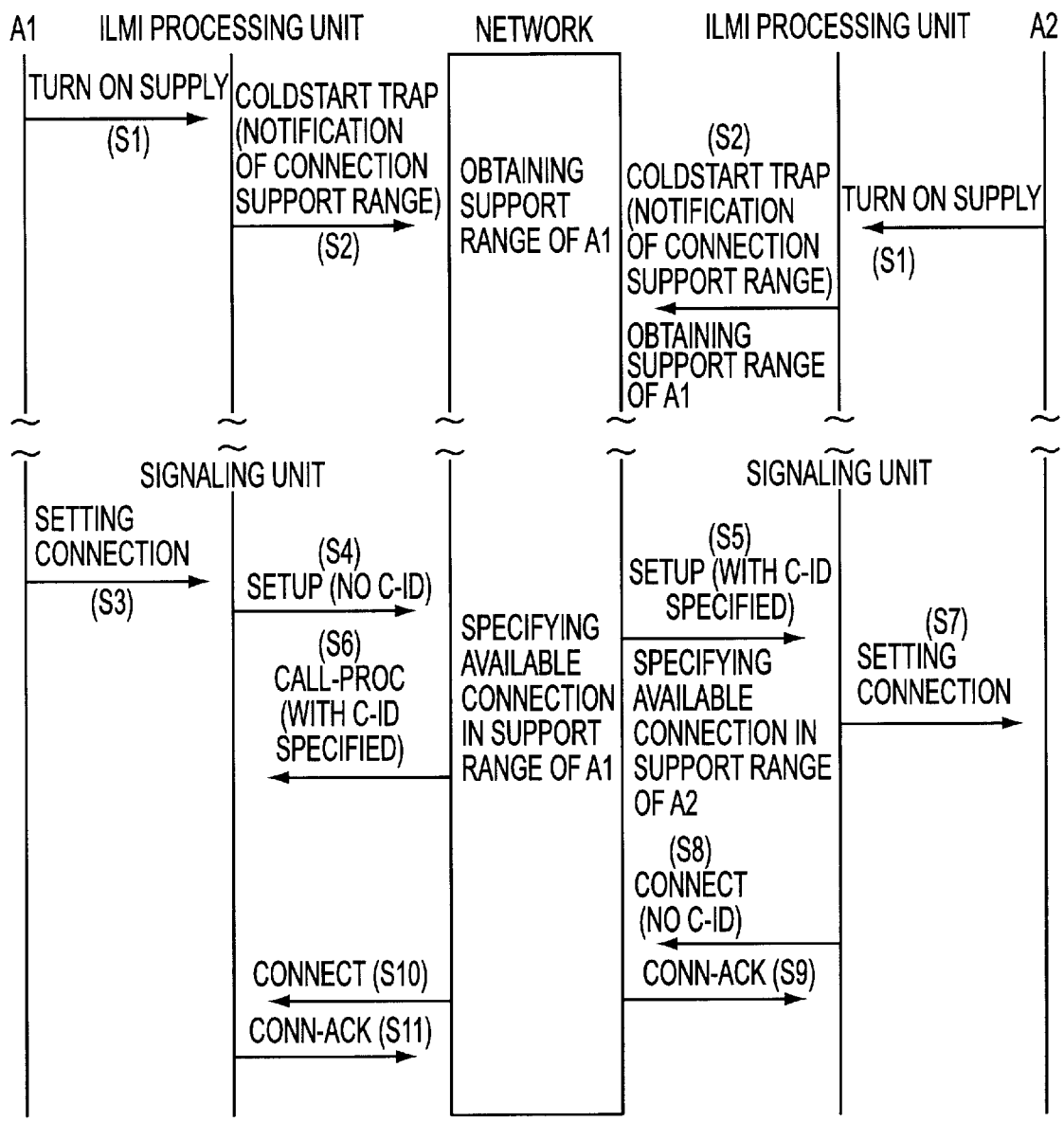
FIG. 8 shows the sequence of the first preferred embodiment (ILMI cold start trap) of the present invention.
Figure 9:
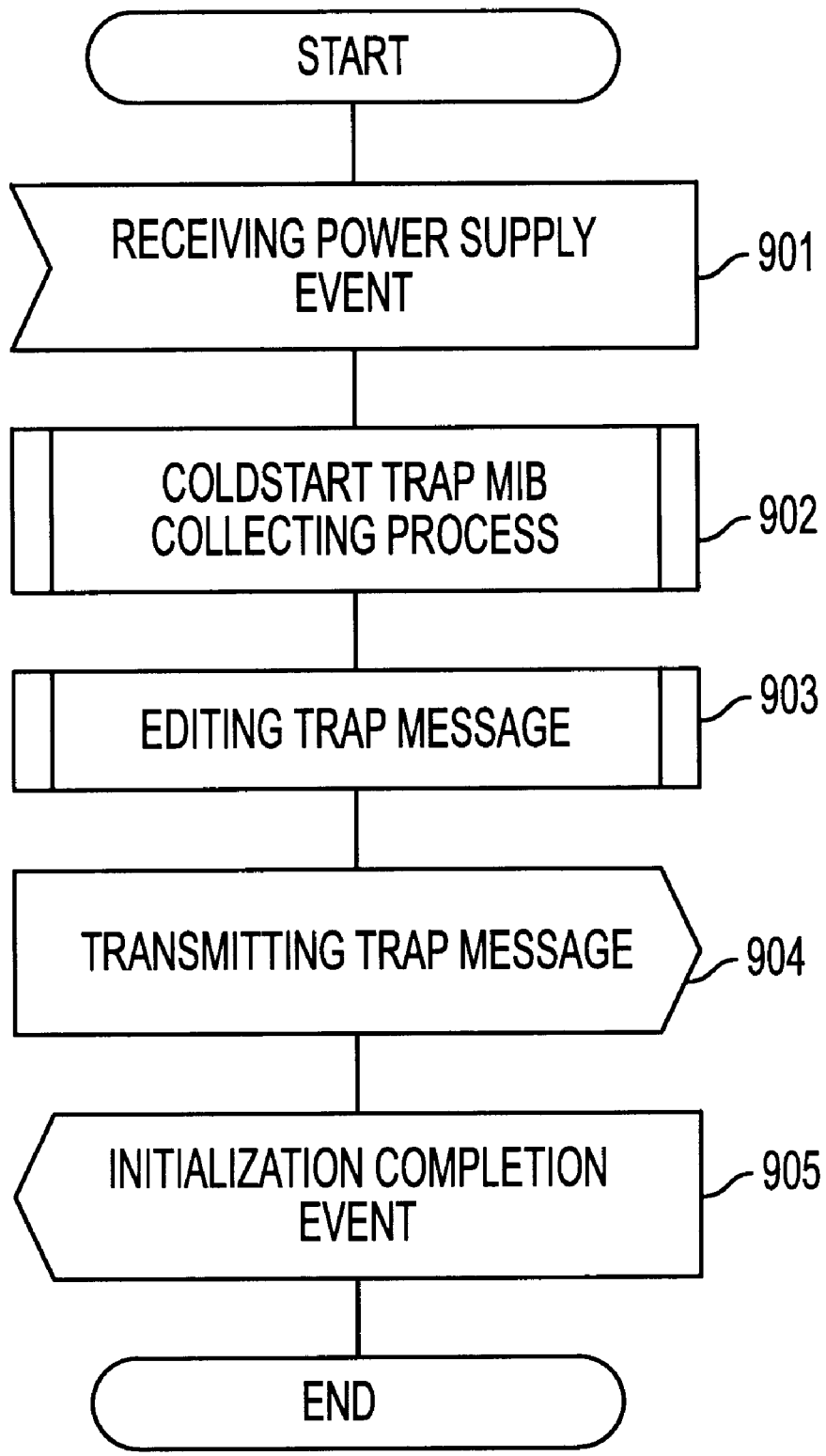
FIG. 9 is a flowchart showing the operation of the ILMI processing unit (cold start trap at the terminal unit)

When the source ATM terminal unit 410 (A1) is turned on, the ATM call control unit 406 triggers the ILMI processing unit 407 (S1 shown in FIG. 8 and 901 shown in FIG. 9).

The information referring/setting unit 701 (FIG. 7) in the ILMI processing unit 407 obtains information by issuing a request to get the information to the application corresponding data unit 408 (FIG. 4) or the port corresponding data unit 408 (FIG. 5) managing the support range information about the VPI/VCI (902 shown in FIG. 9).

Next, the MIB analyzing/editing unit 702 (FIG. 7) in the ILMI processing unit 407 edits and generates the cold start trap message containing the MIB in which the support range information about the VPI/VCI is set (903 in FIG. 9).

The protocol processing unit 703 (FIG. 7) in the ILMI processing unit 407 transmits the cold start trap message (cold start trap) to the UNI 402 through the cell-extracting/inserting unit 404 and cell concentrating/distributing unit 403 (S2 in FIG. 8 and 904 in FIG. 9).

Then, the protocol processing unit 703 notifies the ATM call control unit 406 of a completion-of-initialization event indicating that the cold start trap message has been sent (905 in FIG. 9).

Figure 10:
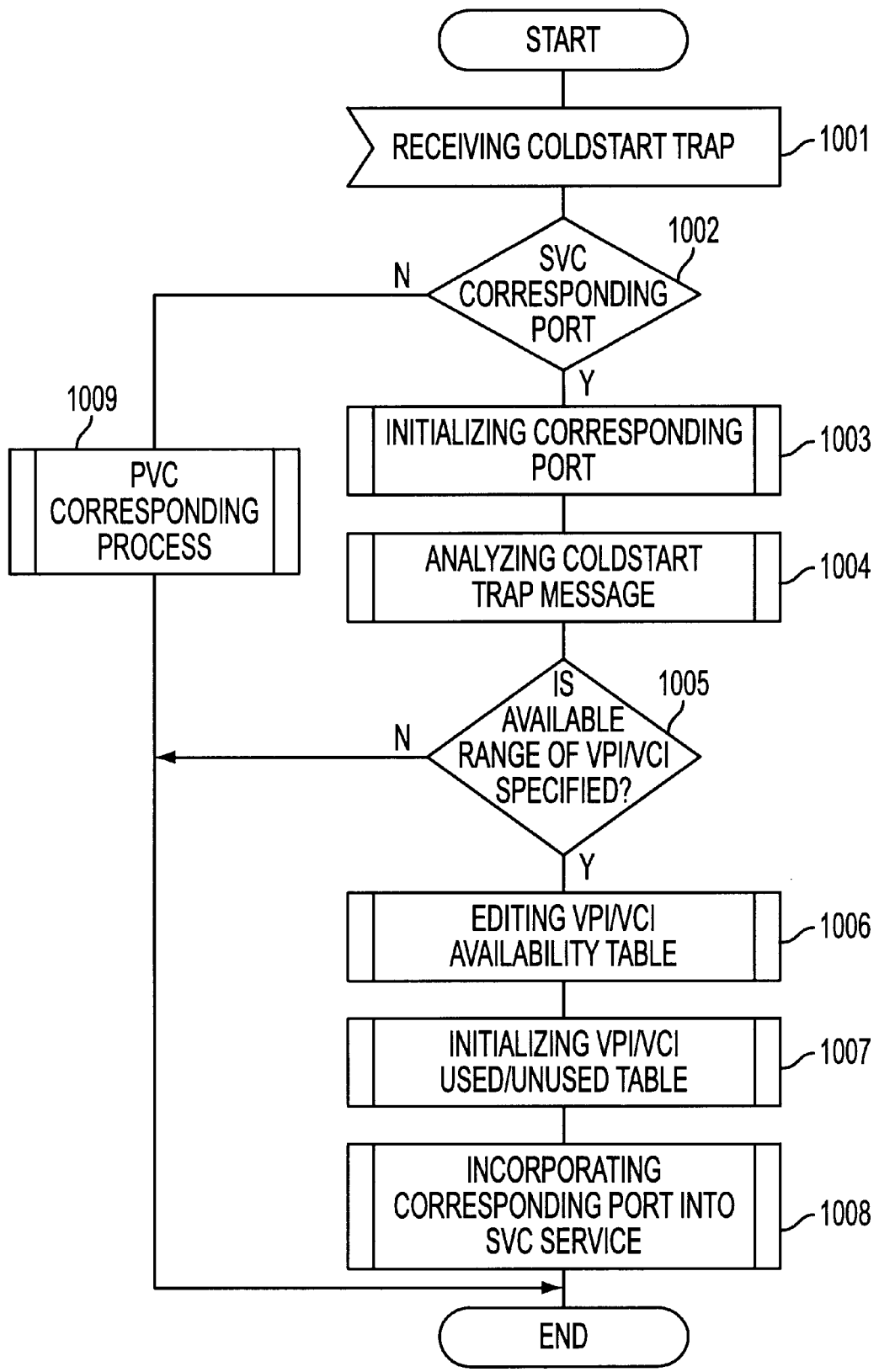
FIG. 10 is a flowchart showing the operation of the ILMI processing unit (cold start trap at the network)

The above described cold start trap message is received by a processor (not shown in FIG. 4) in the ATM network 401 (1001 shown in FIG. 10).

The above described processor determines whether the corresponding port of the UNI 402 that has received the cold start trap message corresponds to the switched virtual channel (SVC) service or the permanent virtual circuit (PVC) service (1002 shown in FIG. 10).

If the corresponding port of the UNI 402 corresponds to the PVC service, then the process for the PVC service is performed (1009 shown in FIG. 10). Since this process does not directly relate to the present invention, the description is omitted here.

If the corresponding port of the UNI 402 corresponds to the SVC service, then the port of the UNI 402 is initialized (1003 shown in FIG. 10).

Next, the processor in ATM network 401 analyzes the contents of the received cold start trap message (1004 shown in FIG. 10).

If the cold start trap message does not specify the support range information about the VPI/VCI (the determination in 1005 shown in FIG. 10 indicates 'No') as a result of the analysis, then the processor in the ATM network 401 terminates the process of entering the range of the VPI/VCI.

On the other hand, if the cold start trap message specifies the support range information about the VPI/VCI (the determination in 1005 shown in FIG. 10 indicates 'Yes') as a result of the analysis, then the processor in the ATM network 401 edits the entry contents of the VPI/VCI availability table corresponding to the port of the UNI 402 according to the support range information about the VPI/VCI (1006 shown in FIG. 10). This is the feature of the present invention.

The processor in the ATM network 401 initializes the VPI/VCI used/unused table corresponding to the port of the UNI 402 (1007 shown in FIG. 10).

Finally, the processor in the ATM network 401 incorporates the port of the UNI 402 into the SVC service (1008 shown in FIG. 10).

When the ATM terminal unit 410 (A2) at the destination terminal is turned on as shown in FIG. 8, the support range information about the VPI/VCI corresponding to the terminal is provided to the ATM network 401 and entered therein as described above.

Figure 1:
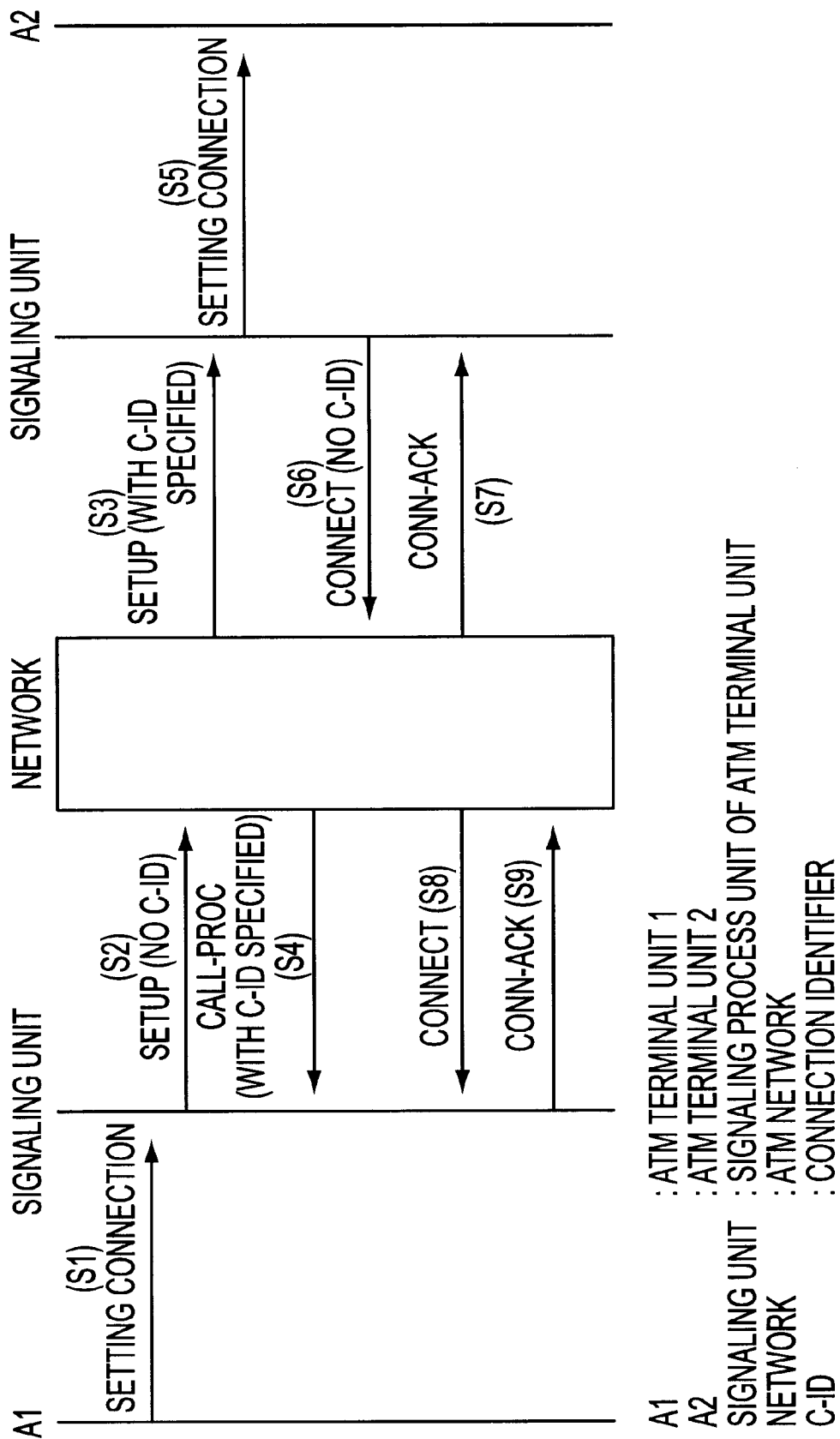
FIG. 1 shows the conventional sequence in setting the C-ID by the network.

The operations (S3 through S11 shown in FIG. 8) performed when a calling is released from the source ATM terminal unit 410 (A1) are similar to the operations (S1 through S9 shown in FIG. 1) described by referring to FIG. 1. The operations in S3 through S11 shown in FIG. 8 are described below by referring to the flowcharts shown in FIGS. 11 and 12.

A specified application (shown in FIG. 4) of the source ATM terminal 1 (A1) or a non-ATM terminal unit (shown in FIG. 5) transmits a request to set a connection to the ATM call control unit 406 (signaling unit) (S3 shown in FIG. 8).

The request is first received by the service request receiving unit 601 (shown in FIG. 6) in the ATM call control unit 406 and provided for the protocol processing unit 602. The protocol processing unit 602 requests the call state management unit 604 to hunt a call reference, that is, a value identifying a calling during the signaling process (1101 shown in FIG. 11).

Figure 11:
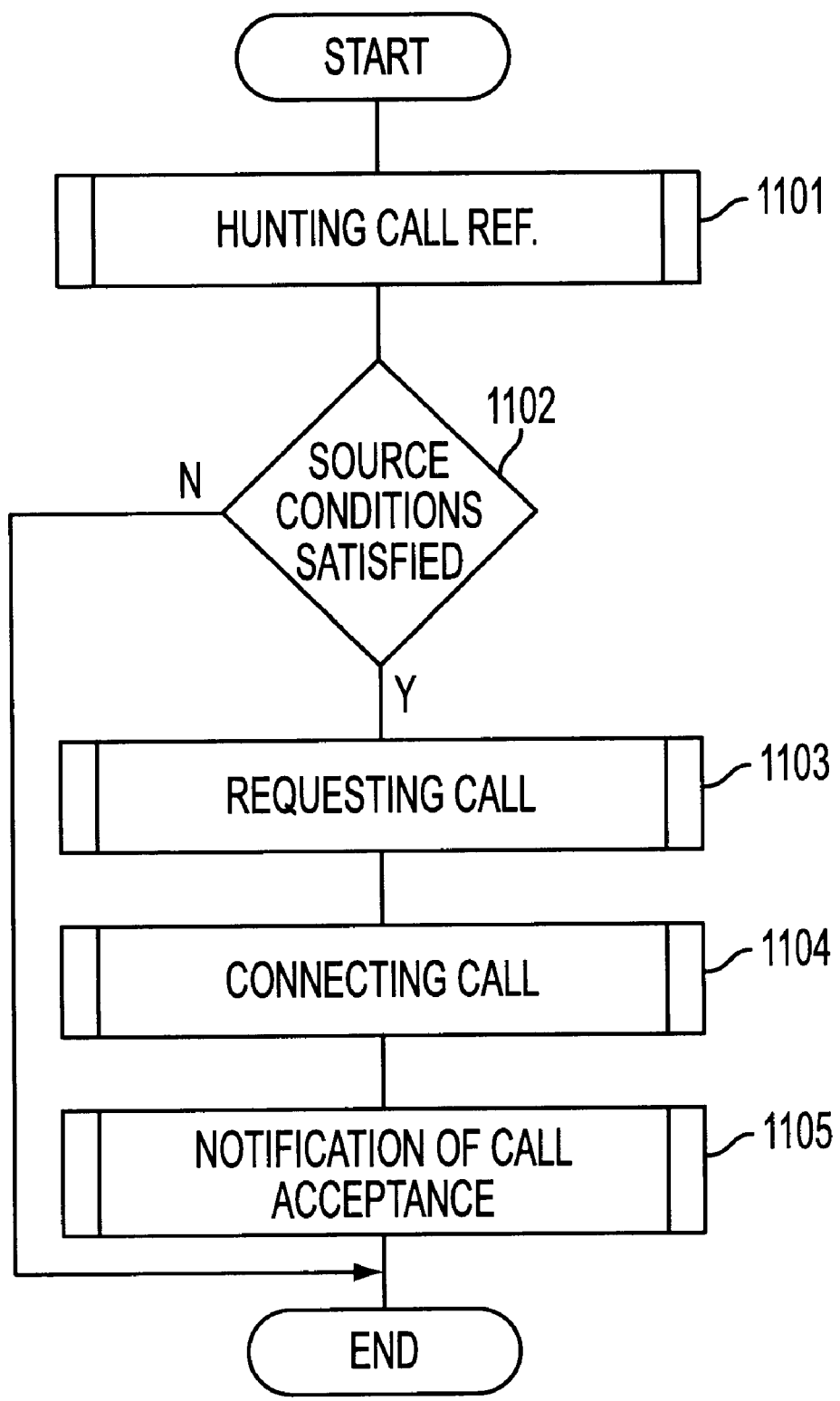
FIG. 11 is a flowchart showing the operation of the connection setting process by the network (at the source terminal)

When the source conditions are set by successfully hunting the call reference, the protocol processing unit 602 generates a SETUP message including the above described call reference ((2) shown in FIG. 29 and (2) shown in FIG. 32), and requests the signaling protocol unit 405 (shown in FIG. 4 or 5) to send the SETUP message (1102 and 1103 shown in FIG. 11). In this case, since the ATM network 401 is already informed of the support range about the VPI/VCI of the source ATM terminal unit 410 as described above, the SETUP message does not have to specify the value conditions for the connection identifier (C-ID).

If the call reference has not been successfully hunted, the calling is not established (determination in 1102 shown in FIG. 11 is 'No').

Upon receipt of the SETUP message, the processor in the ATM network 401 determines the connection identifier corresponding to the connection requested through the message based on the contents of the entry stored in the VPI/VCI availability table corresponding to the port of the UNI 402 which received the message.

Then, the processor in the ATM network 401 generates another SETUP message (refer to (14) shown in FIG. 29 and (14) in FIG. 40) specifying the value of the determined connection identifier, and transmits it to the ATM call control unit 406 (shown in FIG. 4 or 5) in the ATM terminal unit 410 at the destination terminal (S5 shown in FIG. 8). In response to the SETUP message received from the source terminal, the processor in the ATM network 401 returns to the ATM call control unit 406 at the source terminal a CALL-PROCEEDING (CALL-PROC) message (refer to (14) shown in FIG. 31 and (14) shown in FIG. 40) specifying the value of the connection identifier (S6 shown in FIG. 8).

Figure 12:
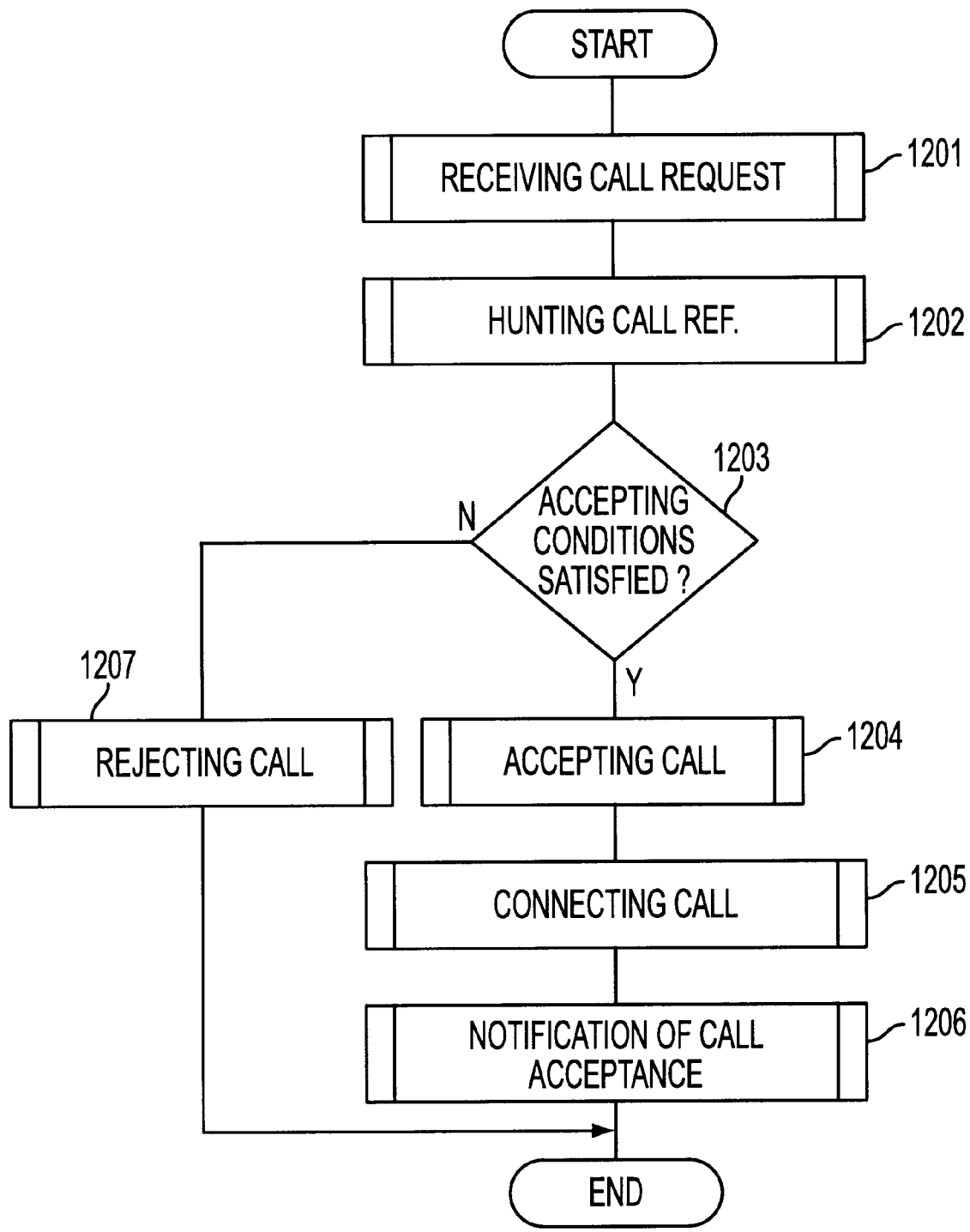
FIG. 12 is a flowchart showing the operation of the connection setting process by the network (at the destination terminal)

When the protocol processing unit 602 (shown in FIG. 6) in the ATM call control unit 406 at the destination terminal receives a SETUP message from the UNI 402 through the cell concentrating/distributing unit 403, cell-extracting/inserting unit 404, and signaling protocol unit 405, it analyzes the contents of the message, specifies the destination, and updates the corresponding control table (1201 shown in FIG. 12).

Then, the protocol processing unit 602 requests the call state management unit 604 to hunt the call reference, that is, a value identifying the calling during the signaling process (1202 shown in FIG. 12).

When the call-acceptance conditions are met by successfully hunting the call reference, then the protocol processing unit 602 generates a CONNECT message (response message) containing the above described call reference (refer to (2) shown in FIG. 30 and (2) shown in FIG. 32), and requests the signaling protocol unit 405 to send the CONNECT message (S8 shown in FIG. 8, and 1203 and 1204 shown in FIG. 12). In this case, since the ATM network 401 has already been informed of the support range of the VPI/VCI of the ATM terminal unit 410 at the destination terminal as described above, it is not required to specify in the CONNECT message a change value, etc. for the connection identifier (C-ID).

When the call reference is not successfully hunted, the protocol processing unit 602 performs a calling rejection process (1203 through 1207 shown in FIG. 12).

When the protocol processing unit 602 accepts the calling, the service request receiving unit 601 (shown in FIG. 6) in the ATM call control unit 406 at the destination terminal updates the table corresponding to the application at the destination terminal in the application corresponding data unit 408 (shown in FIG. 4) or the non-ATM terminal unit at the destination terminal in the port corresponding data unit 408 (shown in FIG. 5) (1205 shown in FIG. 12).

The service request receiving unit 601 transmits a connection setting notification to the application or non-ATM terminal unit at the destination terminal (S7 shown in FIG. 8 and 1206 shown in FIG. 12).

Upon receipt of a CONNECT message from the destination terminal, the processor in the ATM network 401 returns a CONN-ACK message (acknowledgement message) to the destination terminal (S9 shown in FIG. 8) and returns a CONNECT message to the source terminal (S10 shown in FIG. 8).

When the protocol processing unit 602, in the ATM call control unit 406 at the source terminal, receives a CONNECT message after the CALL-PROC message in which a connection identifier is specified, the service request receiving unit 601 (shown in FIG. 6) updates the table corresponding to the application at the source terminal in the application corresponding data unit 408 (shown in FIG. 4) or the non-ATM source terminal unit in the port corresponding data unit 408 (shown in FIG. 5) (1104 shown in FIG. 11), and then transmits a connection setting notification to the application or non-ATM source terminal unit (S7 shown in FIG. 8 and 1105 shown in FIG. 11).

The protocol processing unit 602 in the ATM call control unit 406 at the source terminal generates a CONN-ACK message and requests the signaling protocol unit 405 to return the CONN-ACK message (S11 shown in FIG. 8).

Explanation of the Second Preferred Embodiment

The second preferred embodiment of the present invention based on the above described configurations shown in FIGS. 4 through 7 is explained below by referring to the sequence shown in FIG. 13, the flowchart shown in FIG. 14 (process at the terminal unit), and the flowchart shown in FIG. 15 (process at the network).

According to the second preferred embodiment, as in the first preferred embodiment, the terminal unit provides the network with the cold start trap message from the ILMI when the power is applied to the terminal unit. However, the MIB containing the support range information about the VPI/VCI is set in the information get-response message in response to the information get-request message provided from the network, not to the cold start trap message. Thus, the support range about the VPI/VCI is automatically provided by the terminal unit to the network.

First, as in the first preferred embodiment, the SNMP/ILMI processing unit 407 in the ATM terminal unit 410 terminates an ILMI. Therefore, also in this preferred embodiment, this processing unit 407 is referred to as an ILMI processing unit 407.

Figure 13:
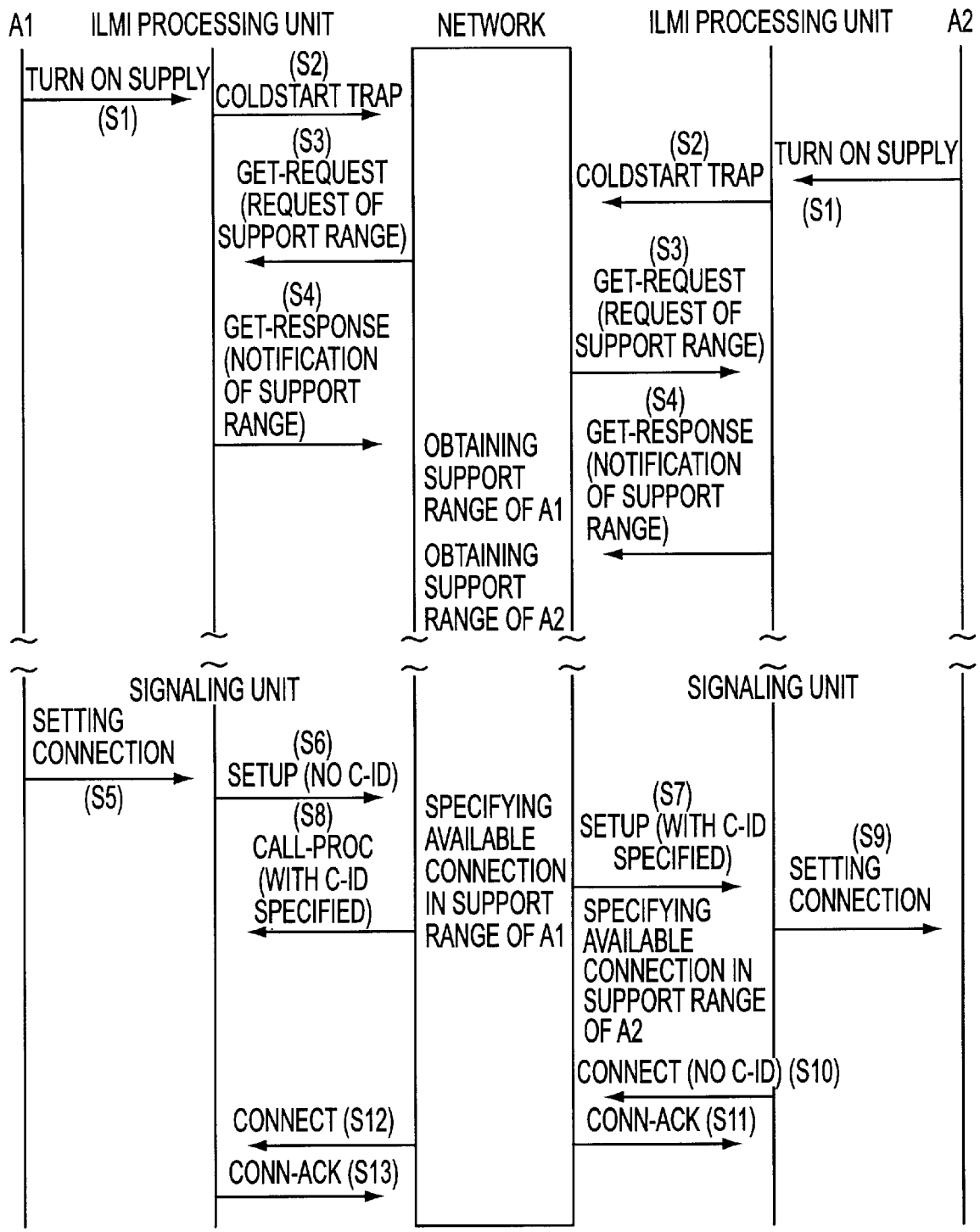
FIG. 13 shows the sequence according to the second preferred embodiment (ILMI get-request) of the present invention.
Figure 14:
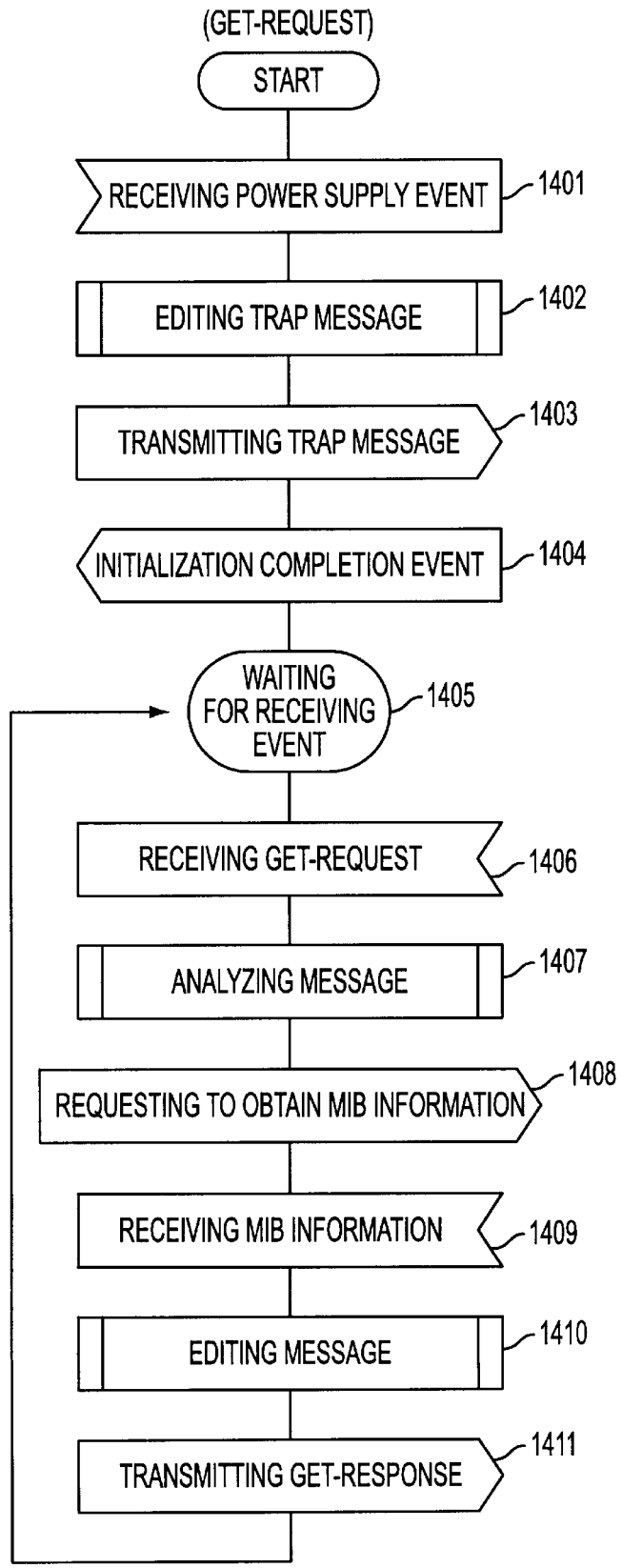
FIG. 14 is a flowchart showing the operation of the ILMI processing unit (get-request at the terminal unit)

When the source ATM terminal unit 410 (A1) is turned on, the ATM call control unit 406 triggers the ILMI processing unit 407 (S1 shown in FIG. 13 and 1401 shown in FIG. 14).

Next, the MIB analyzing/editing unit 702 (shown in FIG. 7) in the ILMI processing unit 407 edits and generates the MIB for a cold start trap message (1402 shown in FIG. 14). Unlike the first preferred embodiment, this MIB does not contain the support range information about the VPI/VCI.

The protocol processing unit 703 (FIG. 7) in the ILMI processing unit 407 transmits the cold start trap message (cold start trap) containing the MIB to the UNI 402 through the cell-extracting/inserting unit 404 and cell concentrating/distributing unit 403 (S2 in FIG. 13 and 1403 in FIG. 14).

Then, the protocol processing unit 703 notifies the ATM call control unit 406 of a completion-of-initialization event indicating that the cold start trap message has been sent (1404 in FIG. 14).

The protocol processing unit 703 in the ILMI processing unit 407 enters a wait state (1405 shown in FIG. 14).

Figure 15:
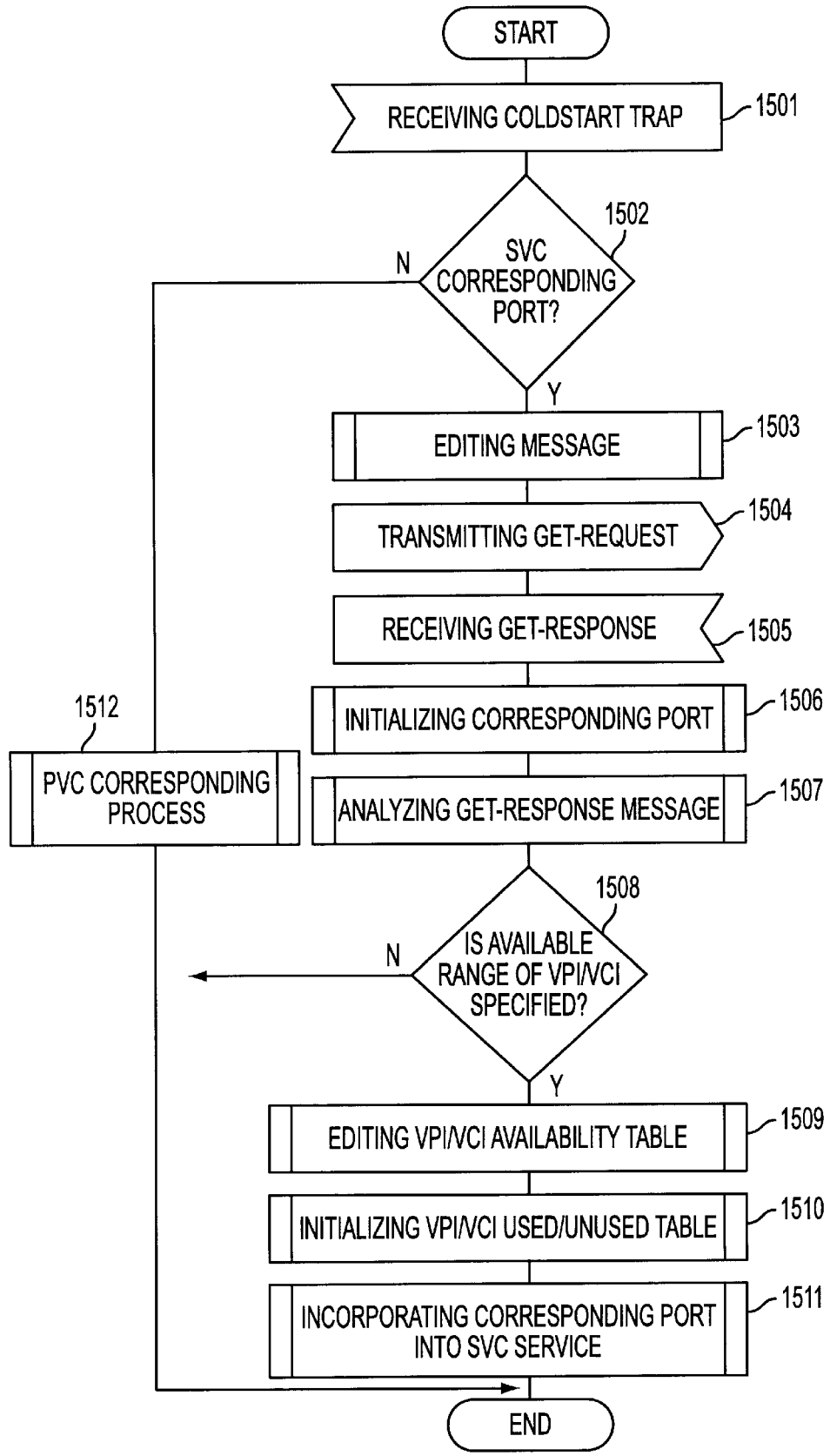
FIG. 15 is a flowchart showing the operation of the ILMI processing unit (get-request at the network)

The above described cold start trap message is received by a processor in the ATM network 401 (1501 shown in FIG. 15).

The above described processor determines whether the corresponding port of the UNI 402 that has received the cold start trap message corresponds to the SVC service or the PVC service (1502 shown in FIG. 15).

If the corresponding port of the UNI 402 corresponds to the PVC service, then the process for the PVC service is performed (1512 shown in FIG. 15). Since this process does not directly relate to the present invention, the description is omitted here.

If the corresponding port of the UNI 402 corresponds to the SVC service, then an information get-request message requesting to get the support range information about the VPI/VCI is edited (1503 shown in FIG. 15), and sent to the ILMI processing unit 407 in the source ATM terminal unit 410 (S3 shown in FIG. 13 and 1504 shown in FIG. 15).

When the protocol processing unit 703 in the ILMI processing unit 407 at the source terminal receives the above described information get-request message (1406 shown in FIG. 14), the MIB analyzing/editing unit 702 (shown in FIG. 7) in the ILMI processing unit 407 at the source terminal analyzes the contents of the above described information get-request message, and is informed that the message requests to get the support range information about the VPI/VCI (1407 shown in FIG. 14).

As a result, the information referring/setting unit 701 (shown in FIG. 7) in the ILMI processing unit 407 at the source terminal obtains the information (1409 shown in FIG. 14) by issuing an information get request to the application corresponding data unit 408 (shown in FIG. 4) or the port corresponding data unit 408 (shown in FIG. 5) managing the support range information about the VPI/VCI (1408 shown in FIG. 14).

Next, the MIB analyzing/editing unit 702 (shown in FIG. 7) in the ILMI processing unit 407 edits and generates the information get-response message containing the MIB in which the support range information about the VPI/VCI is set (1410 shown in FIG. 14).

The protocol processing unit 703 (FIG. 7) in the ILMI processing unit 407 transmits the information get-response message to the UNI 402 through the cell-extracting/inserting unit 404 and cell concentrating/distributing unit 403 (S4 shown in FIG. 13 and 1411 shown in FIG. 14). Then, the protocol processing unit 703 in the ILMI processing unit 407 returns to an event reception wait state again.

The above described information get-response message is received by the processor in the ATM network 401 (1505 shown in FIG. 15).

The above described processor initializes the port of the UNI 402 which received the information get-response message (1506 shown in FIG. 15).

Next, the processor in the ATM network 401 analyzes the contents of the received information get-response message (1507 shown in FIG. 15).

Unless the information get-response message specifies the support range information about the VPI/VCI as a result of the analysis (determination in 1508 shown in FIG. 15 indicates 'No'), the processor in the ATM network 401 terminates the process for entering the range of the VPI/VCI.

On the other hand, if the information get-response message specifies the support range information about the VPI/VCI as a result of the analysis (determination in 1508 shown in FIG. 15 indicates 'Yes'), the processor in the ATM network 401 edits the contents of the entries of the VPI/VCI availability table corresponding to the port of the UNI 402 according to the support range information about the VPI/VCI (1509 shown in FIG. 15). This is the feature of the present invention.

Then, the processor in the ATM network 401 initializes the VPI/VCI used/unused table corresponding to the port of the UNI 402 (1510 shown in FIG. 15).

Finally, the processor in the ATM network 401 incorporates the corresponding port of the UNI 402 into the SVC service (1511 shown in FIG. 15).

When the power is applied to the ATM terminal unit 410 (A2) as shown in FIG. 8, the support range information about the VPI/VCI corresponding to the terminal unit is provided for the ATM network 401 and entered therein as described above.

Then, the operations performed when the ATM terminal unit 410 (A1) releases a calling (S5 through S13 shown in FIG. 13) are the same as those (S3 through S11 shown in FIG. 8) performed according to the first preferred embodiment described by referring to FIGS. 8, 11, and 12.

Explanation of the Third Preferred Embodiment

The third preferred embodiment of the present invention based on the above described configurations shown in FIGS. 4 through 7 is explained below by referring to the sequence shown in FIG. 16.

According to the third preferred embodiment, the terminal unit automatically provides the network with the support range information about the VPI/VCI using the cold start trap message from the SNMP through an SNMP manager when the power is applied to the terminal unit. That is, according to the third preferred embodiment, the ILMI protocol in the first preferred embodiment is replaced with the SNMP protocol. The third embodiment is different from the first embodiment in the SNMP manager between the terminal unit and the network.

First, the SNMP/ILMI processing unit 407 in the ATM terminal unit 410 terminates an SNMP (simple network management protocol). Hereinafter, the SNMP/ILMI processing unit 407 is referred to as an SNMP processing unit 407. The SNMP is described later in detail by referring to FIGS. 18 through 24.

Figure 16:
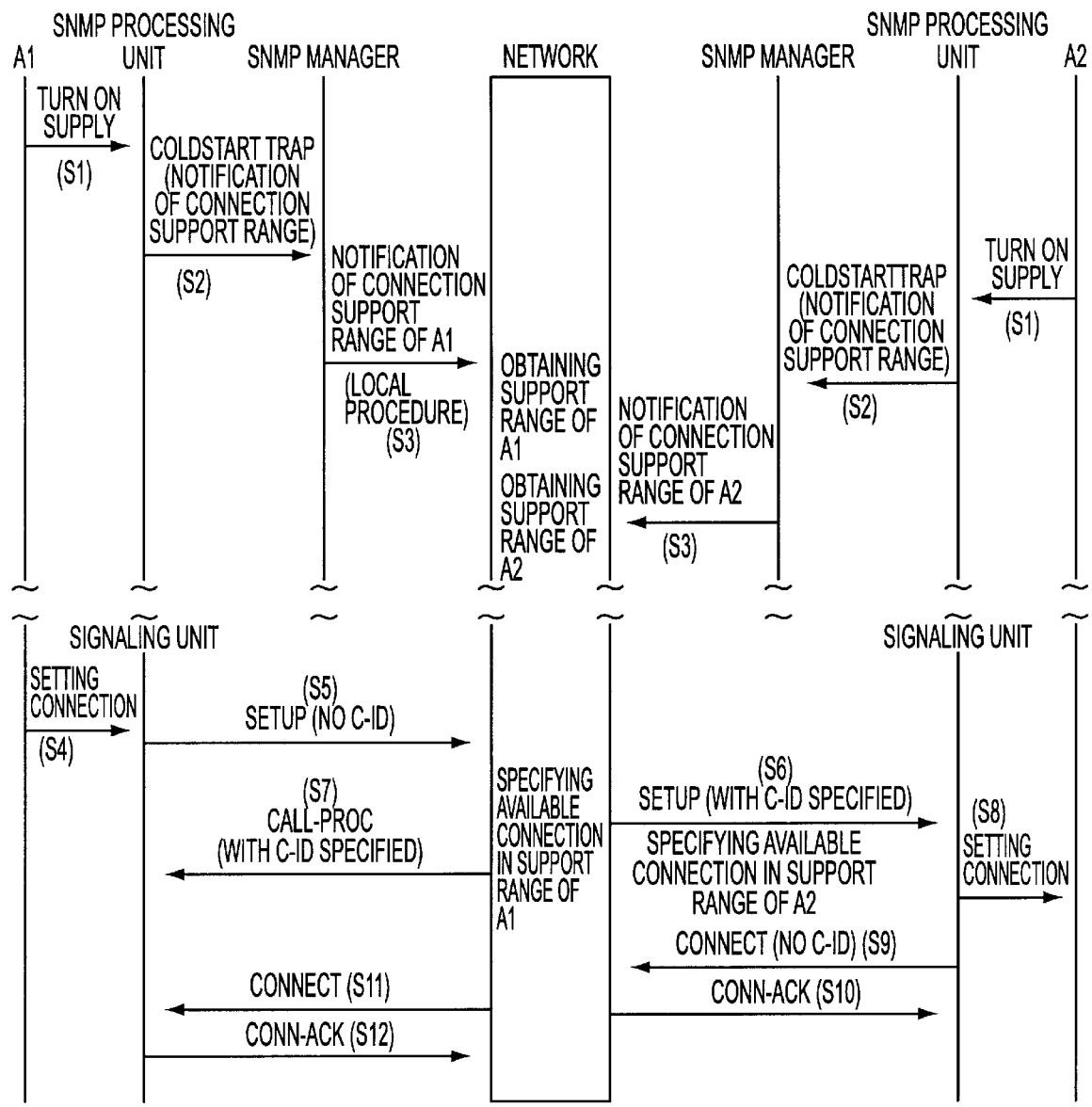
FIG. 16 shows the sequence according to the third preferred embodiment (SNMP cold start trap) of the present invention.

When the ATM source terminal unit 410 (A1) is turned on, the ATM call control unit 406 triggers the SNMP processing unit 407 (S1 shown in FIG. 16).

The information referring/setting unit 701 (FIG. 7) in the SNMP processing unit 407 obtains the information by issuing a request to get the information to the application corresponding data unit 408 (FIG. 4) or the port corresponding data unit 408 (FIG. 5) managing the support range information about the VPI/VCI.

Next, the MIB analyzing/editing unit 702 (FIG. 7) in the SNMP processing unit 407 edits and generates the cold start trap message containing the MIB in which the support range information about the VPI/VCI is set.

The protocol processing unit 703 (FIG. 7) in the SNMP processing unit 407 transmits the cold start trap message (cold start trap) to the UNI 402 through the cell-extracting/inserting unit 404 and cell concentrating/distributing unit 403 (S2 in FIG. 16).

Then, the protocol processing unit 703 notifies the ATM call control unit 406 of a completion-of-initialization event indicating that the cold start trap message has been sent.

The above described cold start trap message is received by an SNMP manager (not shown in FIG. 4) in the ATM network 401. The SNMP manager retrieves the support range information about the VPI/VCI from the MIB contained in the received cold start trap message, and provides the information for the processor (not shown in FIG. 4) in the ATM network 401 using the local procedure (S3 shown in FIG. 16).

The processor in the ATM network 401 enters the support range information about the VPI/VCI provided from the SNMP manager corresponding to the port of the UNI 402 which received the information. The operation is the same as the operation performed when the cold start trap message corresponding to the SVC service is received by the processor in the ATM network 401 in the above described first preferred embodiment.

When the power is applied to the ATM terminal unit 410 (A2) at the destination terminal as shown in FIG. 16, the support range information about the VPI/VCI corresponding to the terminal unit is provided for the ATM network 401 through the SNMP manager and entered therein as described above.

Then, the operation (S3 through S11 shown in FIG. 16) performed when the source ATM terminal unit 410 (A1) releases a calling is the same as the operation (S3 through S11 shown in FIG. 8) performed in the first preferred embodiment as described above by referring to FIGS. 8, 11, and 12.

Explanation of the Fourth Preferred Embodiment

The fourth preferred embodiment of the present invention based on the above described configurations shown in FIGS. 4 through 7 is explained below by referring to the sequence shown in FIG. 17.

According to the fourth preferred embodiment, as in the third preferred embodiment, a cold start trap message from the SNMP is transmitted to the SNMP manager when the power is applied to the terminal unit. However, the MIB containing the support range information about the VPI/VCI is set in the information get-response message in response to the information get-request message provided from the SNMP manager, not to the cold start trap message. Thus, the support range information about the VPI/VCI is automatically provided by the terminal unit to the network through the SNMP manager.

First, as in the third preferred embodiment, the SNMP/ILMI processing unit 407 in the ATM terminal unit 410 terminates an SNMP. Therefore, also in this preferred embodiment, this processing unit 407 is referred to as an SNMP processing unit 407.

Figure 17:
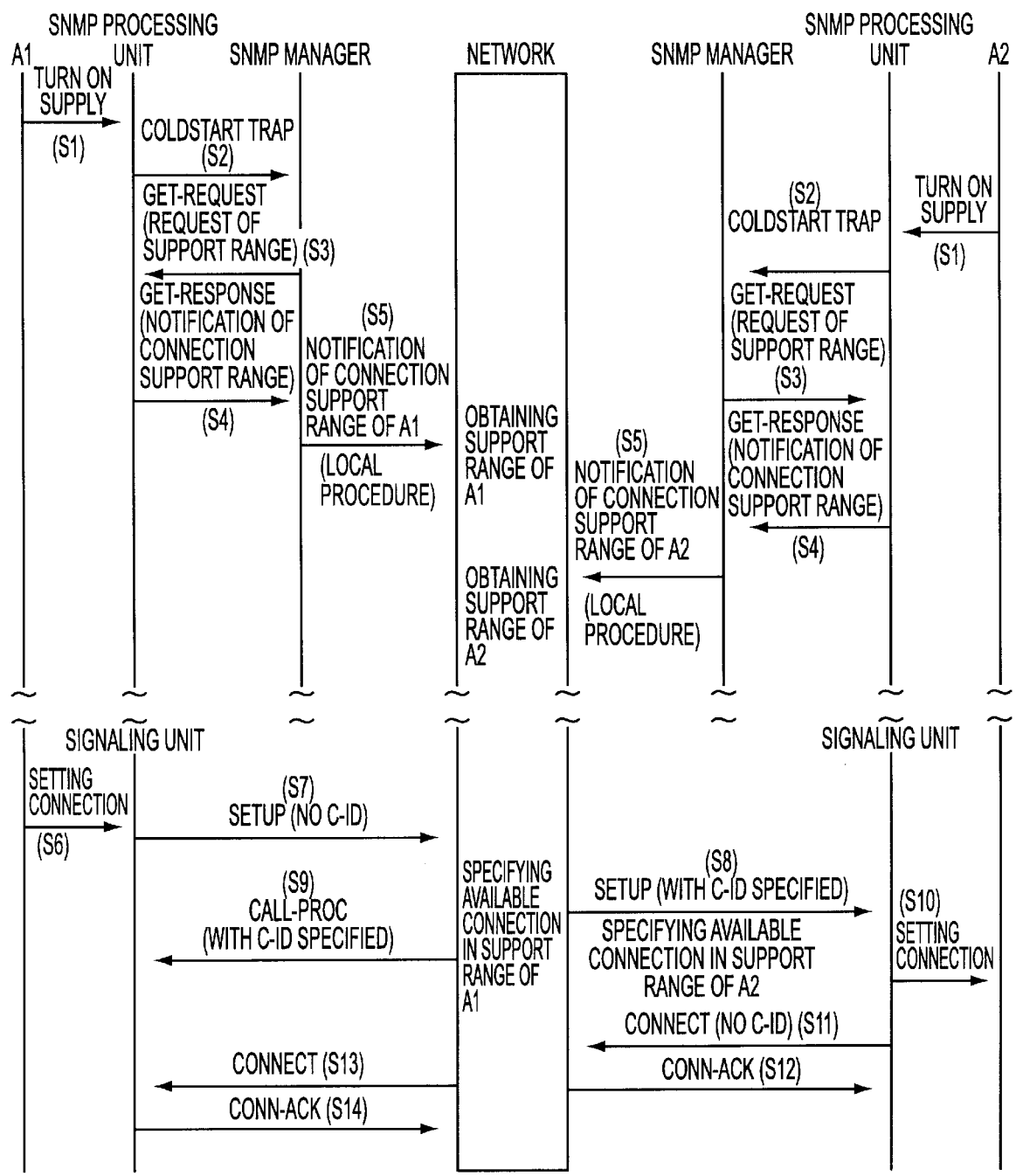
FIG. 17 shows the sequence according to the fourth preferred embodiment (SNMP get-request) of the present invention.

When the source ATM terminal unit 410 (A1) is turned on, the ATM call control unit 406 triggers the SNMP processing unit 407 (S1 shown in FIG. 17).

Next, MIB analyzing/editing unit 702 (shown in FIG. 7) in the SNMP processing unit 407 edits and generates the MIB for a cold start trap. Unlike the third preferred embodiment, this MIB does not contain the support range information about the VPI/VCI.

The protocol processing unit 703 (FIG. 7) in the SNMP processing unit 407 transmits the cold start trap message (cold start trap) containing the MIB to the UNI 402 through the cell-extracting/inserting unit 404 and cell concentrating/distributing unit 403 (S2 in FIG. 17).

Then, the protocol processing unit 703 notifies the ATM call control unit 406 of a completion-of-initialization event indicating that the cold start trap message has been sent.

The protocol processing unit 703 in the SNMP processing unit 407 enters a wait state.

The above described cold start trap message is received by the SNMP manager (not shown in FIG. 4). When the SNMP manager receives a cold start trap message, the SNMP manager edits an information get-request message requesting to get the support range information about the VPI/VCI, and sends it to the SNMP processing unit 407 in the source ATM terminal unit 410 (S3 shown in FIG. 17).

When the protocol processing unit 703 in the SNMP processing unit 407 at the source terminal receives the above described information get-request message, the MIB analyzing/editing unit 702 (shown in FIG. 7) in the SNMP processing unit 407 at the source terminal analyzes the contents of the above described information get-request message, and is informed that the message requests to get the support range information about the VPI/VCI.

As a result, the information referring/setting unit 701 (shown in FIG. 7) in the SNMP processing unit 407 obtains the information by issuing a request to get the information to the application corresponding data unit 408 (shown in FIG. 4) or the port corresponding data unit 408 (shown in FIG. 5) managing the support range information about the VPI/VCI.

Next, the MIB analyzing/editing unit 702 (shown in FIG. 7) in the ILMI processing unit 407 edits and generates the information get-response message containing the MIB in which the support range information about the VPI/VCI is set.

The protocol processing unit 703 (FIG. 7) in the SNMP processing unit 407 transmits the information get-response message to the UNI 402 through the cell-extracting/inserting unit 404 and cell concentrating/distributing unit 403 (S4 shown in FIG. 17). Then, the protocol processing unit 703 in the SNMP processing unit 407 returns to an event reception wait state again.

The above described information get-response message is received by the SNMP manager, not shown in FIG. 4. The SNMP manager retrieves the support range information about the VPI/VCI from the MIB contained in the received information get-response message, and provides the information for the processor (not shown in FIG. 4) in the ATM network 401 using the local procedure (S5 shown in FIG. 17).

The processor in the ATM network 401 enters the support range information about the VPI/VCI provided from the SNMP manager corresponding to the port of the UNI 402 which received the information. The operation is the same as the operation performed when the information get-response message corresponding to the SVC service is received by the processor in the ATM network 401 in the above described second preferred embodiment.

When the power is applied to the ATM terminal unit 410 (A2) at the destination terminal as shown in FIG. 17, the support range information about the VPI/VCI corresponding to the terminal unit is provided for the ATM network 401 through the SNMP manager and entered therein as described above.

Then, the operation (S6 through S14 shown in FIG. 17) performed when the source ATM terminal unit 410 (A1) releases a calling is the same as the operation (S3 through S11 shown in FIG. 8) performed in the first preferred embodiment as described above by referring to FIGS. 8, 11, and 12.

Explanation of SNMP Protocol

The ILMI protocol used in the first and second preferred embodiments and the SNMP protocol used in the third and fourth preferred embodiments of the present invention are sequentially described below. Since the ILMI protocol is based on the SNMP protocol, the SNMP protocol is explained first.

Figure 18:
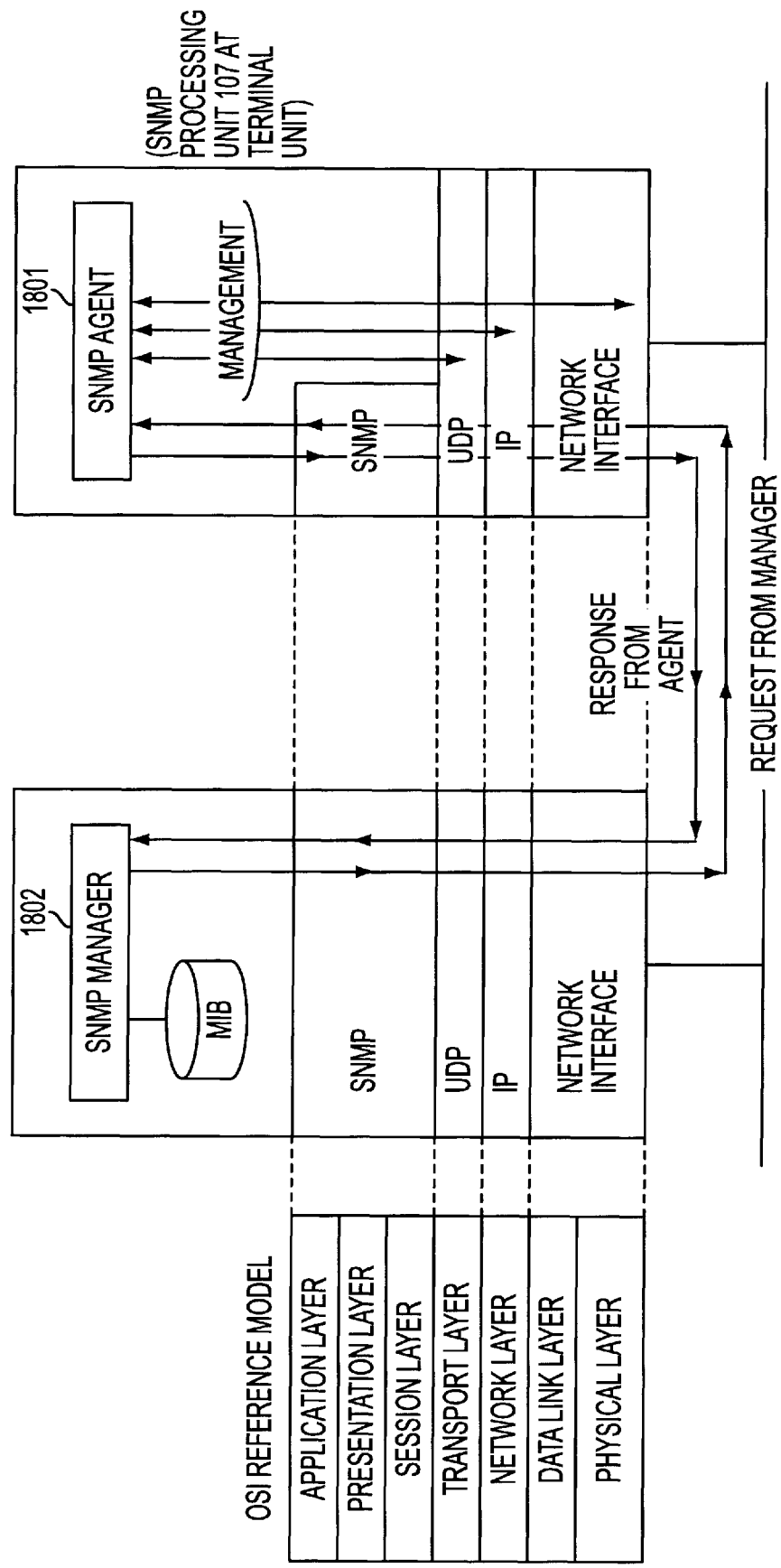
FIG. 18 shows the outline of the operation of the SNMP.
Figure 21:
FIG. 21 shows the type of an SNMP message.

FIG. 18 shows the outline of the operation of the SNMP.

The SNMP is a protocol for collecting and changing the network management information.

IN the SNMP, network management information is exchanged between an SNMP manager 1802 provided at a management system (at the ATM network 401 in each of the above described preferred embodiments) and an SNMP agent 1801 provided at a managed system (at the terminal unit in each of the above described preferred embodiments). The SNMP agent 1801 corresponds to the SNMP processing unit 407 shown in FIG. 4 or 5 (or ILMI processing unit 407).

The items of the network management information to be exchanged in the SNMP are referred to as message information bases MIB. According to the above described third and fourth preferred embodiments, a specific item to be managed in the MIB is used in specifying the support range information about the VPI/VCI.

FIG. 19 shows the first example of the MIB in the SNMP protocol corresponding to the support range information about the VPI/VCI. In this example, the maximum bit length of the support VPI value is specified by the "atmInterfaceMaxActiveVpiBits" data of the "atmInterfaceConfTable" information group, and the maximum bit length of the support VCI value is specified by "atmInterfaceMaxActivevciBits" data. These data are represented by integers.

FIG. 20 shows the second example of the MIB in the SNMP protocol corresponding to the support range information about the VPI/VCI. In this example, the maximum value of the support VPI value is specified by the "atmInterfaceMaxActiveVpiValue" data of the "atmInterfaceConfTable" information group, and the minimum value of the support VPI value is specified by "atmInterfaceMinActiveVpiValue" data. The maximum value of the support VCI value is specified by the "atmInterfaceMaxActiveVciValue" data of the "atmInterfaceConfTable" information group, and the minimum value of the support VCI value is specified by "atmInterfaceMinActiveVciValue" data. These data are represented by integers.

According to the third and fourth preferred embodiments of the present invention, in the SNMP agent 1801, which is the SNMP processing unit 407, the MIB shown in FIGS. 19 or 20 is stored in the SNMP message, transmitted to the SNMP manager 1802 connected to the ATM network 401, and then provided to the processor (not shown in FIG. 4) in the ATM network 401 from the SNMP manager 1802. As described above, according to the third preferred embodiment of the present invention, the MIB shown in FIGS. 19 or 20 is stored and transmitted in a cold start trap message. According to the fourth preferred embodiment of the present invention, the MIB shown in FIGS. 19 or 20 is stored and transmitted in the information get-response message in response to the information get-request message. The cold start trap message, information get-request message, and information get-response message form part of an SNMP message shown in FIG. 21.

Figure 22:
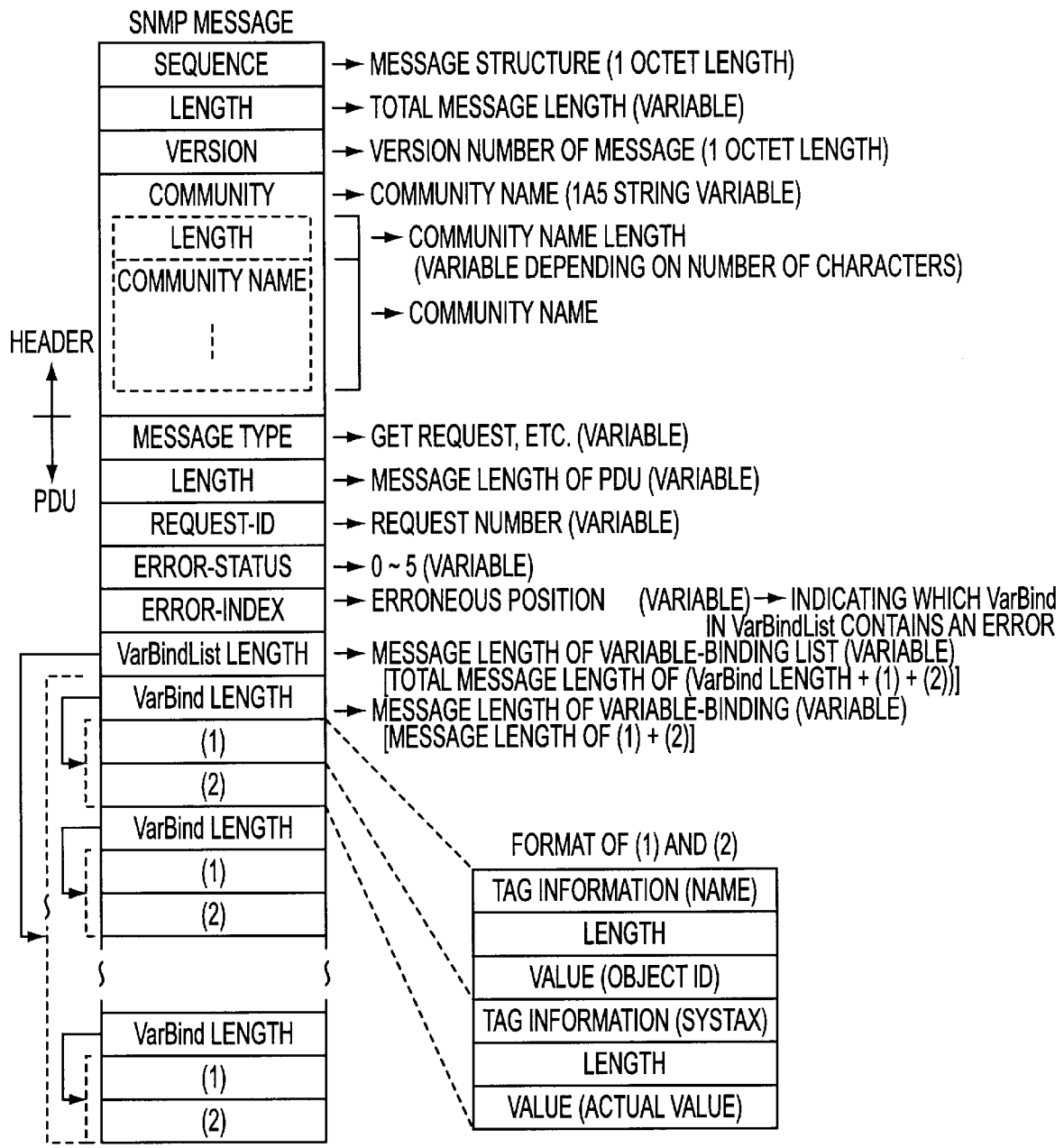
FIG. 22 shows the data format of the SNMP message.

FIG. 22 shows the data format of the SNMP message exchanged between the SNMP agent 1801 and SNMP manager 1802 in the SNMP. In this data format, the "message type" field stores an identification value indicating the type of the SNMP message, and each of the plural sets of format portions indicated by 1 and 2 stores the data shown in FIGS. 19 or 20. In the later described ILMI protocol, the "community name" field shown in FIG. 22 stores an identification value indicating the ILMI.

Practically, the identification value (object ID) indicating the "atmlnterfaceMaxActiveVpiBits" data is stored in the value field of the portion indicated by 1 of the first format portion of the "atmInterfaceConfTable" information group shown in FIG. 19, and the data value of the "atmInterface-MaxActiveVpiBits" data is stored in the value field of the portion indicated by 2 of the first format portion. The identification value (object ID) indicating the "atmInterface-MaxActiveVciBits" data is stored in the value field of the portion indicated by 1 of the second format portion, and the data value of the "atmInterfaceMaxActiveVciBits" data is stored in the value field of the portion indicated by 2 of the second format portion. Since there are 4 types of data in the case shown in FIG. 20, the data are stored in four sets of format portions.

Figure 23:
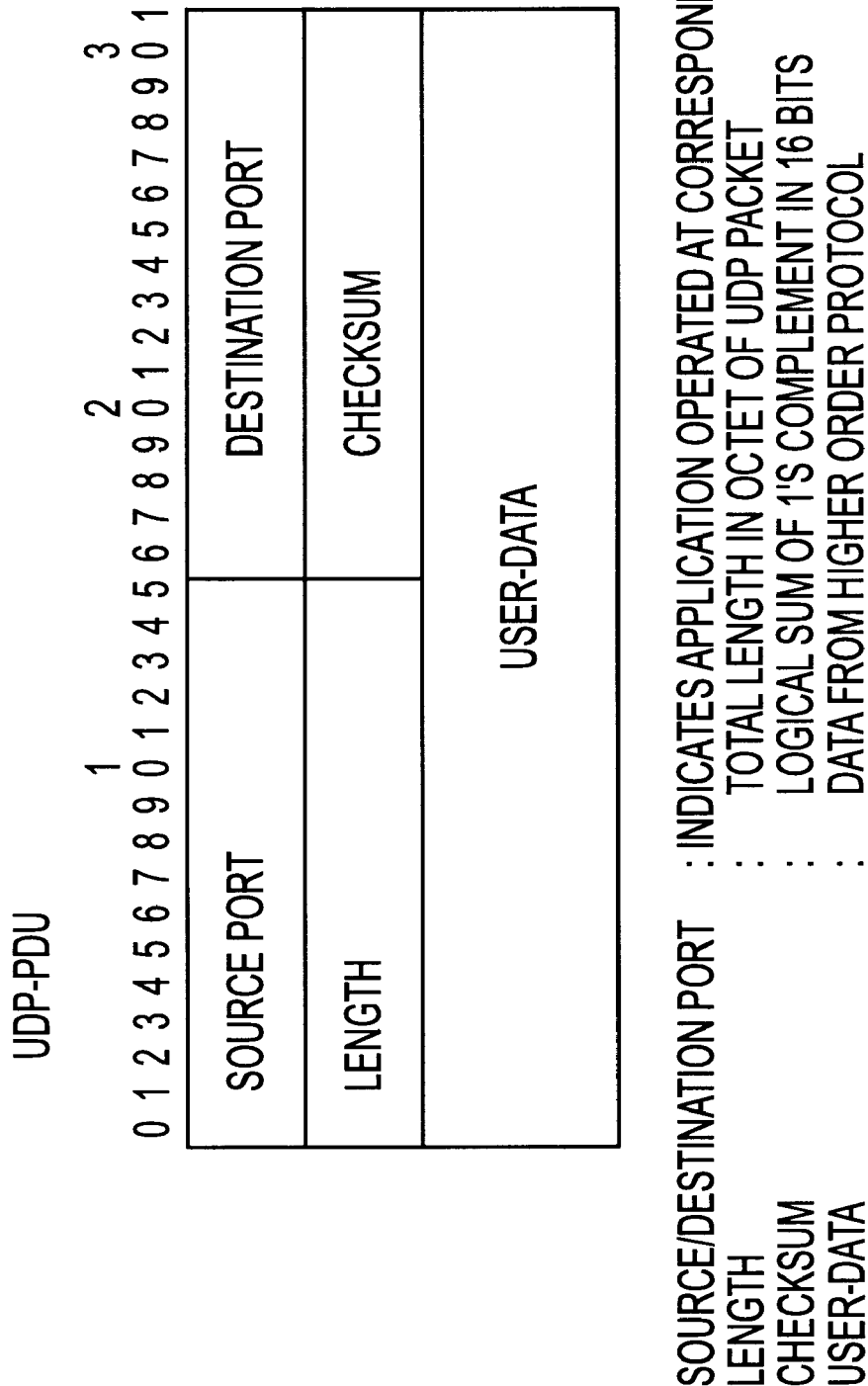
FIG. 23 shows the data format of the UDP-PDU.

The SNMP message having the data format shown in FIG. 22 is stored in the user datagram protocol-protocol data unit (UDP-PDU), that is, the protocol data unit in the transport layer of the OSI reference model shown in FIG. 18. FIG. 23 shows the data format of the UDP-PDU. In FIG. 23, the SNMP message is stored in the "user-data" field of the UDP-PDU.

The UDP-PDU having the data format shown in FIG. 23 is stored in the Internet Protocol-Protocol Data Unit (IP-PDU) which is the protocol data unit in the network layer of the OSI reference model shown in FIG. 18. FIG. 24 shows the data format of the IP-PDU. In FIG. 24, the UDP-PDU is stored in the "user-data" field of the IP-PDU.

The IP-PDU is not shown in FIG. 18, but stored in the protocol data unit of the LLC (LLC encapsulation for routed protocol) in the data link layer. In the data link layer, the protocol of an ATM adaptation layer (AAL) is prescribed at a lower order of the LLC. In these protocols, higher order protocol data units are hierarchically stored in the "user-data" fields (payloads) of lower order protocol data units. Of these protocol data units, the lowest order protocol data unit is stored in the payload of the ATM cell specified between the data link layer and physical layer of the OSI reference model shown in FIG. 18, and transmitted in the UNI 402 (shown in FIG. 4 or 5).

Practically, the LLC is a protocol prescribed to transmit the IP-PDU through the local network. The AAL is a protocol for absorbing the difference in quality for each service provided when data of each service type is stored and transmitted in an ATM cell. The AAL of type 5 can be used in this example. In the AAL, a service specific convergence sublayer-protocol data unit (SSCS-PDU), a common part convergence sublayer-protocol data unit (CPCS-PDU), and a segmentation and reassembly sublayer-protocol data unit (SAR-PDU) are prescribed from a higher order layer to a lower order layer. The SSCS-PDU and CPCS-PDU are data units prescribed to control, for example, the flow of data. The SAR-PDU is a data unit prescribed to disassemble or assemble the ATM cell. The above described IP-PDU is stored in the payload of the LLC-PDU. The LLC-PDU is stored in the payload of the SSCS-PDU. The SSCS-PDU is stored in the payload of the CPCS-PDU. The CPCS-PDU is divided and stored in a plurality of the payloads of the SAR-PDUs. The data length of the SAR-PDU is 48 bytes, and the SAR-PDU is stored and transmitted in the payload of the ATM cell.

Explanation of ILMI Protocol

Described below is the interim local management interface (ILMI) protocol used in the above described first and second preferred embodiments of the present invention.

Figure 25:
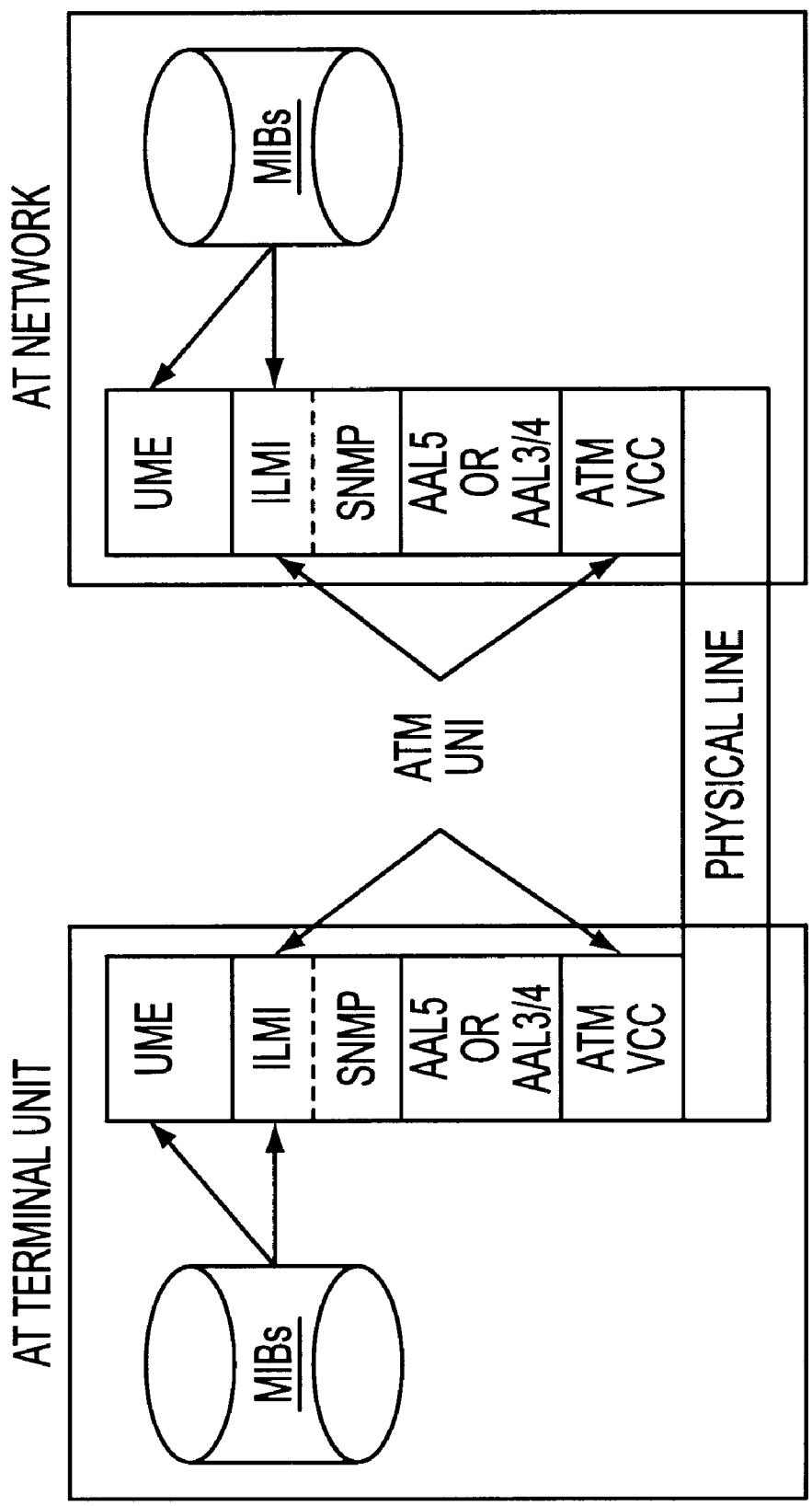
FIG. 25 shows the outline of the operations of the ILMI.

FIG. 25 shows the outline of the operations of the ILMI.

The ILMI protocol is based on the SNMP protocol. As shown in FIG. 25, the ILMI protocol stack is obtained by removing the IP protocol and UDP protocol from the SNMP protocol stack shown in FIG. 18. The SNMP is positioned at an order higher than the AAL protocol referred to as type 5, 3, or 4. The ILMI protocol is positioned to have inclusive functions. An UNI management entity (UME) protocol for setting communications using the ILMI protocol is positioned at an order higher than the ILMI protocol.

In the SNMP protocol stack described by referring to FIG. 18, the SNMP manager 1802 is provided between the terminal unit and the ATM network 401 (shown in FIG. 4 or 5), and the terminal unit communicates with the processor in the ATM network 401 through the SNMP manager 1802. In the ILMI protocol stack shown in FIG. 25, the processor in the ATM network 401 uses the ILMI protocol to exchange the network management information directly with the terminal unit.

In the ILMI protocol, the network management information item is exchanged using the message information base MIB. In the above described first and second preferred embodiments of the present invention, the specific items to be managed in the MIB are used in specifying the support range of the VPI/VCI.

FIG. 26 shows the first example of the MIB in the ILMI protocol corresponding to the support range information about the VPI/VCI. In this example, the maximum bit length of the support VPI value is specified by the "atmfAtmLayerMaxVpiBits" data of the "atmfAtmLayerGroup" information group, and the maximum bit length of the support VCI value is specified by "atmfAtmLayerMaxVciBits" data. These data are represented by integers.

FIG. 27 shows the second example of the MIB in the ILMI protocol corresponding to the support range information about the VPI/VCI. In this example, the maximum value of the support VPI value is specified by the "atmfAtmLayerMaxVpiValue" data of the "atmfAtmLayerGroup" information group, and the minimum value of the support VPI value is specified by "atmfAtmLayerMinVpiValue" data. The maximum value of the support VCI value is specified by the "atmfAtmLayerMaxvciValue" data of the "atmfAtmLayerGroup" information group, and the minimum value of the support VCI value is specified by "atmfAtmLayerMinVciValue" data. These data are represented by integers.

Figure 28:
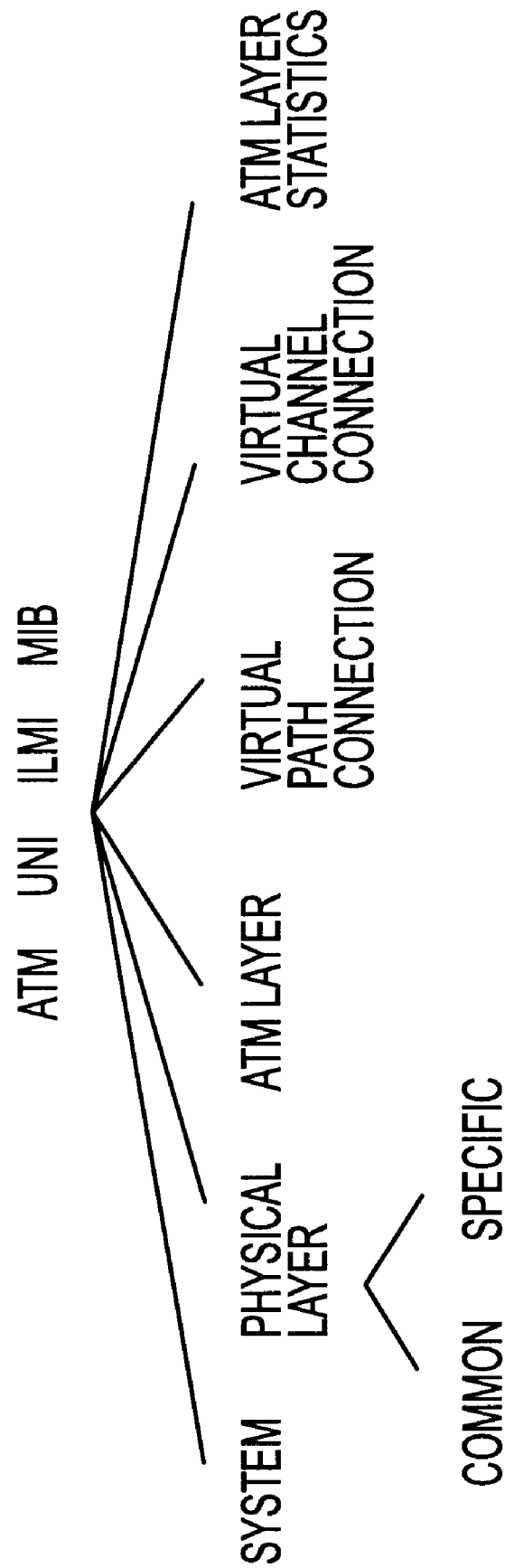
FIG. 28 shows the tree structure of the MIB in the ILMI.

The MIB in the ILMI protocol is classified based on the tree structure shown in FIG. 28, and the "atmfAtmLayerGroup" information group shown in FIGS. 26 and 27 belongs to the "ATM Layer" shown in FIG. 28.

According to the first and second preferred embodiments of the present invention, the ILMI processing unit 407 stores the MIB shown in FIG. 26 or 27 in the above described SNMP message (shown in FIG. 22), and the MIB is provided for the processor (not shown in FIG. 4) in the ATM network 401. As described above, according to the first preferred embodiment of the present invention, the MIB shown in FIG. 26 or 27 is stored in the cold start trap message for transfer. According to the second preferred embodiment, the MIB shown in FIG. 26 or 27 is stored in the information get-response message, that is, a response to the information get-request message for transfer.

In the data format of the SNMP message shown in FIG. 22, the "community name" field stores an identification value indicating the ILMI. Each of a plurality of sets of the format portions indicated by 1 and 2 stores each piece of data shown in FIG. 26 or 27.

A more practical explanation is given below. That is, the value field of the portion indicated by 1 of the first format portion of the "atmfAtmLayerGroup" information group shown in FIG. 26 stores the identification value (object ID) indicating the "atmfAtmLayerMaxVpiBits" data. The value field of the portion indicated by 2 of the first format portion stores the data value of the "atmfAtmLayerMaxVpiBits" data. The value field of the portion indicated by 1 of the second format portion stores the identification value (object ID) indicating the "atmfAtmLayerMaxVciBits" data. The value field of the portion indicated by 2 of the second format portion stores the data value of the "atmfAtmLayerMaxVciBits" data. Since there are 4 types of data in the case shown in FIG. 27, the data are stored in 4 sets of format portions.

In the ILMI protocol, the SNMP message having the data format shown in FIG. 22 is stored in the above described service specific convergence sublayer-protocol data unit (SSCS-PDU) positioned at the highest order in the ATM adaptation layer (AAL) shown in FIG. 25. The SSCS-PDU is stored in the payload unit of the above described CPCS-PDU. The CPCS-PDU is divided and stored in the above described plural SAR-PDUs, and the SAR-PDU is stored and transmitted in the payload unit of the ATM cell.

Explanation of Signaling Message

FIGS. 29, 30, and 31 show examples of the data formats of the signaling messages (L3 messages) used in the above described first through fourth preferred embodiments and the fifth preferred embodiment described later. These messages are a call setup message (SETUP), a response message (CONNECT), and a call reception message (CALL-PROCeeding). Furthermore, in the information element field shown in FIGS. 29 through 31, each piece of data indicated by (1) through (17) has the data format shown in FIGS. 32 through 41.

Explanation of the Protocol Data Unit for Transferring a Signaling Message

Figure 42:
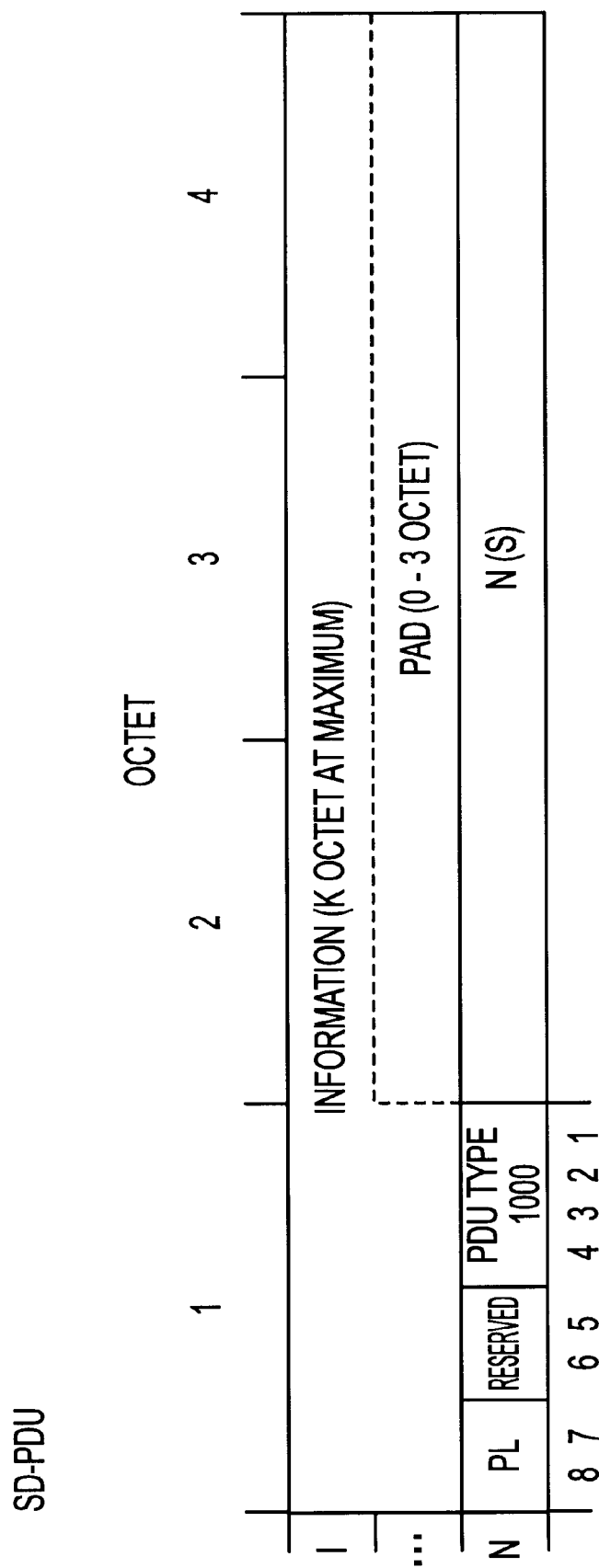
FIG. 42 shows the data format of the SD-PDU.

FIG. 42 shows the data format of the protocol data unit SD-PDU storing the signaling message (L3 message) shown in FIGS. 29 through 41. The SD-PDU is a variation of the service specific connection oriented protocol-protocol data unit (SSCOP-PDU) corresponding to the layer 2 (L2) of an ATM signaling protocol. Furthermore, the SSCOP-PDU forms a service specific convergence sublayer-protocol data unit (SSCS-PDU) positioned at the highest order in the ATM adaptation layer (AAL) for signaling. A type-3 or type-5 AAL is used as a signaling AAL. The above described SSCS-PDU corresponding to the SD-PDU storing a signaling message is stored in the payload portion of the common part convergence sublayer-protocol data unit (CPCS-PDU) in the signaling AAL. Next, the above described CPCS-PDU is divided and stored in the payload portions of a plurality of cell segmentation and reassembly sublayer-protocol data units (SAR-PDU). Then, each of the SAR-PDUs is stored and transmitted in the payload portion of each ATM cell.

Explanation of the Fifth Preferred Embodiment

Described finally is the fifth preferred embodiment of the present invention based on the above described configuration shown in FIG. 4 or 5.

In the above described first through fourth preferred embodiments, the VPI/VCI is determined by a network. In the fifth preferred embodiment, it is determined by a terminal unit.

With the configuration shown in FIG. 4 or 5, the fifth preferred embodiment of the present invention requires no SNMP/ILMI processing unit 407.

FIG. 43 shows the data format for use in specifying the connection identifier contained in the signaling message used in the fifth preferred embodiment of the present invention. It shows the details of the element (14) of each message shown in FIGS. 29 through 31. In FIG. 43, the field "virtual path connection identifier" stores the VPCI (corresponding to the VPI), and the field "virtual channel identifier" stores the VCI. The invariable indication field "preferred/ exclusive" stores a 3-bit value having one of the following meanings.

000: VPCI is invariable, and VCI is also invariable.
001: VPCI is invariable, but VCI is variable.
010: VPCI is variable, but VCI is invariable
Others: reserved values As indicated as a result of the comparison with the conventional data format shown in FIG. 3, a new value 010 is prescribed in an invariable indication field according to the fifth preferred embodiment. In this case, the ATM terminal unit only has to perform a comparatively easy management of a use state of the VCI.

Figure 2:
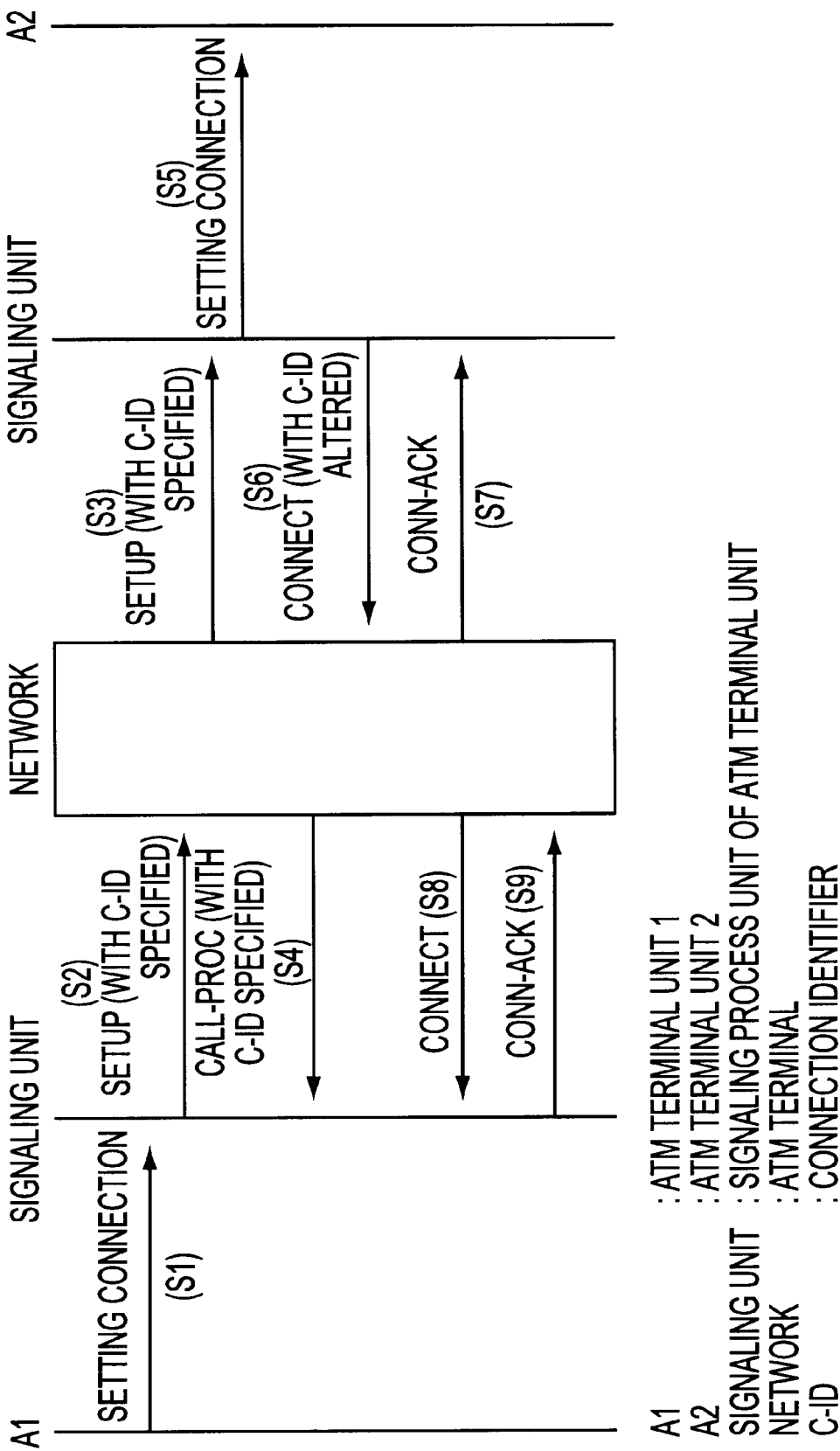
FIG. 2 shows the conventional sequence in setting the C-ID by the terminal unit.

The sequence of the fifth preferred embodiment of the present invention is the same as that of the conventional technology shown in FIG. 2. The operations performed when the VPI/VCI value is determined by a terminal unit according to the fifth preferred embodiment of the present invention are described based on the sequence shown in FIG. 2, the flowchart shown in FIG. 44 (process by a source terminal), and the flowchart shown in FIG. 45 (process by a destination terminal).

First, the specific application (FIG. 4) of a source ATM terminal 1 (A1) or a non-ATM terminal unit (FIG. 5) transmits a connection set request to the ATM call control unit 406 (signaling unit) (S1 shown in FIG. 2).

This request is provided to the protocol processing unit 602 after it is received by the service request receiving unit 601 (shown in FIG. 6) in the ATM call control unit 406. The protocol processing unit 602 requests the call state management unit 604 to hunt the call reference which is an identification value for a call during the signaling process (4401 in FIG. 44).

Figure 44:
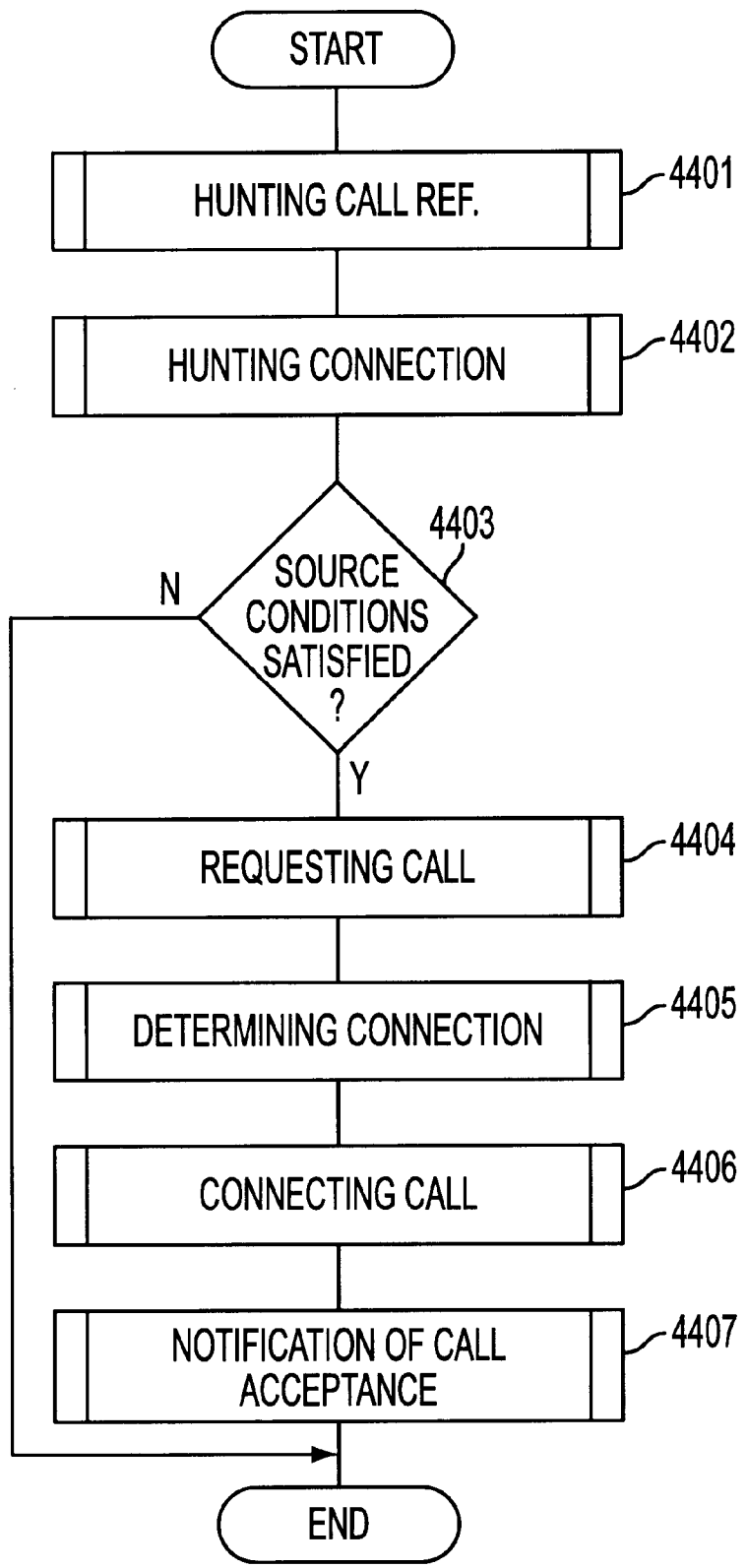
FIG. 44 is a flowchart showing the connection setting process by the terminal unit (at the source terminal)

The protocol processing unit 602 requests the connection state management unit 603 to hunt the VPI/VCI value for connection to be used (4402 shown in FIG. 44).

If a source condition is set by successfully hunting the call reference and VPI/VCI value, then the protocol processing unit 602 generates a SETUP message containing the above described call reference and VPI/VCI value (refer to (2) and (14) shown in FIG. 29, (2) in FIG. 32, and (14) in FIG. 40), and requests the signaling protocol unit 405 (shown in FIG. 4 or 5) to transmit the SETUP message (S2 shown in FIG. 2, 4403 and 4404 shown in FIG. 44). As shown in FIG. 43 (and FIG. 40), in the connection identifier element in the message, the fields "virtual path connection identifier" and "virtual channel identifier" selectively store the above described VPI (VPCI) and VCI. The invariable indication field "preferred/exclusive" can store the 3-bit value 000 (VPCI is invariable, and VCI is also invariable), 001 (VPCI is invariable, but VCI is variable) or 010 (VPCI is variable, but VCI is invariable). These values are a feature of the present invention. If the fifth preferred embodiment of the present invention is configured in such a way that the invariable indication field specifies the value 010, then the connection state management unit 603 (FIG. 6) only has to manage the VCI.

If the call reference or VPI/VCI value has not been successfully hunted, the calling fails (the determination in 4403 shown in FIG. 44 indicates 'No').

Upon receipt of the above described SETUP message, the processor in the ATM network 401 determines the VPI/VCI value corresponding to the requested connection based on the value in the "preferred/exclusive" field and each value in the "virtual path connection identifier" and "virtual channel identifier" fields set in the message.

Then, the processor in the ATM network 401 generates another SETUP message (refer to (14) shown in FIG. 29 and (14) shown in FIG. 40) which specifies the determined VPI/VCI, and transmits it to the ATM call control unit 406 (shown in FIG. 4 or 5) in the destination ATM terminal unit 410 (S3 shown in FIG. 2). In response to the SETUP message received from the source terminal, the processor in the ATM network 401 returns a CALL-PROCEEDING (CALL-PROC) message (refer to (14) shown in FIG. 31 and (14) shown in FIG. 40) specifying the above described VPI/VCI value to the ATM call control unit 406 at the source terminal.

Figure 45:
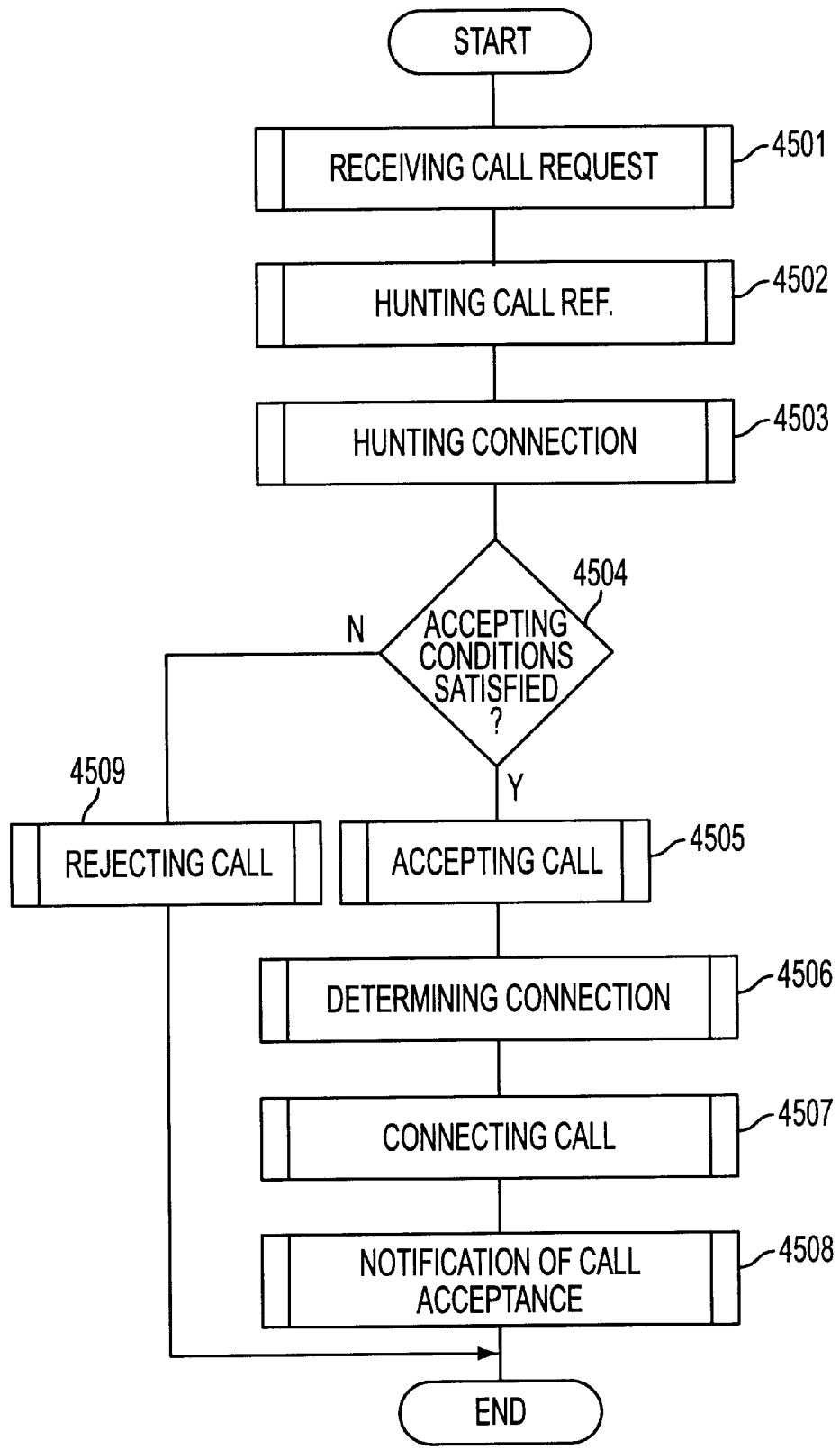
FIG. 45 is a flowchart showing the connection setting process by the terminal unit (at the destination terminal).

Upon receipt of the SETUP message from the UNI 402 through the cell concentrating/distributing unit 403, cell-extracting/inserting unit 404, and signaling protocol unit 405, the protocol processing unit 602 (FIG. 6) in the ATM call control unit 406 at the destination terminal analyzes the contents of the message, specifies its destination, and updates the corresponding control table (4501 shown in FIG. 45).

Next, the protocol processing unit 602 requests the call state management unit 604 to hunt a call reference, that is, an identification value for a calling in the signaling process (4502 shown in FIG. 45).

Using the VPI/VCI value specified in the received SETUP message as a parameter, the protocol processing unit 602 requests the connection state management unit 603 to hunt a VPI/VCI value for connection to be used (4503 shown in FIG. 45). The VPI/VCI value can be altered as necessary.

When the destination conditions are set by successfully hunting the call reference and VPI/VCI value, the protocol processing unit 602 generates a CONNECT message (response message) containing the above described call reference (refer to (2) shown in FIG. 30 and (2) shown in FIG. 32), and requests the signaling protocol unit 405 to transmit the CONNECT message (S6 shown in FIG. 2, and 4504 and 4505 shown in FIG. 45). When the VPI/VCI value is altered at the destination terminal, the VPI/VCI value is added to the above described CONNECT message (refer to (14) shown in FIG. 30 and (14) shown in FIG. 40).

If the call reference is unsuccessfully hunted, then the protocol processing unit 602 performs a calling rejecting process (4504 through 4509 shown in FIG. 45).

Upon receipt of the CONNECT message from the destination terminal, the processor in the ATM network 401 returns a CONN-ACK message (response acknowledgement message) to the destination terminal (S7 shown in FIG. 2), and returns the CONNECT message to the source terminal (S8 shown in FIG. 2).

When the service request receiving unit 601 in the ATM call control unit 406 at the destination terminal is provided with the CONN-ACK message from the signaling protocol unit 405 through the protocol processing unit 602, it requests the connection state management unit 603 to perform a process for a final determination of connection (4506 shown in 45).

Then, the service request receiving unit 601 at the destination terminal updates a table corresponding to an application at the destination terminal in the application corresponding data unit 408 (shown in FIG. 4) or a non-ATM terminal unit at the destination terminal in the port corresponding data unit 408 (shown in FIG. 5) (4507 shown in FIG. 45).

The service request receiving unit 601 at the destination terminal transmits a connection setting notification to the application or non-ATM terminal unit at the destination terminal (S5 shown in FIG. 2 or 4508 shown in FIG. 45).

When the service request receiving unit 601 in the ATM call control unit 406 at the source terminal is notified of the reception of a CALL PROCEEDING (CALL-PROC) message and of a CONNECT message from the signaling protocol unit 405 through the protocol processing unit 602, it requests the connection state management unit 603 to perform the process for a final determination of connection (4405 shown in FIG. 44).

Then, the service request receiving unit 601 at the source terminal updates the table corresponding to the application at the source terminal in the application corresponding data unit 408 (shown in FIG. 4) or to the non-ATM source terminal unit in the port corresponding data unit 408 (shown in FIG. 5) (4406 shown in FIG. 44), and transmits a connection setting notification to the application at the source terminal unit or the non-ATM source terminal unit (4407 shown in FIG. 44).

Upon receipt of the notification of the receipt of the CONNECT message from the signaling protocol unit 405, the protocol processing unit 602 requests the signaling protocol unit 405 to return a CONN-ACK message to the ATM network 401 (S9 shown in FIG. 2).

Other Preferred Embodiments

According to the above described first and second preferred embodiments of the present invention, an SNMP protocol is used as a network management information communications protocol. According to the above described third and fourth preferred embodiments of the present invention, an ILMI protocol is used as a network management information communications protocol. However, the present invention is not limited to these applications, but any network management protocol which transmits a trap message can be used.

What is claimed is:

1. A method for negotiating a connection identifier which identifies a connection set between a device at a terminal unit and a device at a network, comprising the steps of:

supporting a communications protocol for predetermined network management information through the device at the terminal unit and device at the network;

providing, from the device at the terminal unit to the device at the network, support range information about the connection identifier of the device at the terminal unit using a trap message prescribed by the communications protocol at a predetermined timing; and assigning through the device at the network the connection identifier to the device at the terminal unit based on the support range information about the connection identifier provided in the trap message from the device at the terminal unit.

2. A method for negotiating a connection identifier which identifies a connection set between a device at a terminal unit and a device at a network, comprising the steps of:

supporting an interim local management protocol through the device at the terminal unit and device at the network;

providing, from the device at the terminal unit to the device at the network, support range information about a virtual path identifier/virtual channel identifier of the device at the terminal unit using a cold start trap message prescribed by the interim local management protocol when the device at the terminal unit is turned on; and assigning through the device at the network a virtual path identifier/virtual channel identifier to the device at the terminal unit based on the support range information about the virtual path identifier/virtual channel identifier provided in the cold trap message from the device at the terminal unit.

3. A method for negotiating a connection identifier which identifies a connection set between a device at a terminal unit and a device at a network, comprising the steps of:

supporting an interim local management protocol through the device at the terminal unit and device at the network;

providing, from the device at the terminal unit to the device at the network, support range information about a virtual path identifier/virtual channel identifier of the device at the terminal unit using a cold start trap message prescribed by the interim local management protocol when the device at the terminal unit is turned on; and assigning through the device at the network a virtual path identifier/virtual channel identifier to the device at the terminal unit based on the support range information about the virtual path identifier/virtual channel identifier provided in the cold trap message from the device at the terminal unit, wherein said support range information about the virtual path identifier/virtual channel identifier of the device at the terminal unit refers to a message information base indicating a maximum bit length of the virtual path identifier and a message information base indicating a maximum bit length of the virtual channel identifier of a message information base to be managed and prescribed by the interim local management protocol.

4. A method for negotiating a connection identifier which identifies a connection set between a device at a terminal unit and a device at a network, comprising the steps of:

supporting an interim local management protocol through the device at the terminal unit and device at the network;

providing, from the device at the terminal unit to the device at the network, support range information about a virtual path identifier/virtual channel identifier of the device at the terminal unit using a cold start trap message prescribed by the interim local management protocol when the device at the terminal unit is turned on; and assigning through the device at the network a virtual path identifier/virtual channel identifier to the device at the terminal unit based on the support range information about the virtual path identifier/virtual channel identifier provided in the cold trap message from the device at the terminal unit;

wherein said support range information about the virtual path identifier/virtual channel identifier of the device at the terminal unit refers to, of a message information base to be managed and prescribed by the interim local management protocol, a message information base indicating a maximum value of the virtual path identifier, a message information base indicating a minimum value of the virtual path identifier, a message information base indicating a maximum value of the virtual channel identifier, and a message information base indicating a minimum value of the virtual channel identifier.

5. A method for negotiating a connection identifier which identifies a connection set between a device at a terminal unit and a device at a network, comprising the steps of:

supporting an interim local management protocol through the device at the terminal unit and the device at the network;

providing, from the device at the terminal unit to the device at the network, a cold start trap message prescribed by the interim local management protocol when the device at the terminal unit is turned on;

receiving the cold start trap message and transmitting, from the device at the network to the device at the terminal unit, a get-request message, prescribed by the interim local management protocol, requesting support range information about a virtual path identifier/virtual channel identifier of the device at the terminal unit;

receiving the get-request message and transmitting, from the device at the terminal unit to the device at the network, the support range information about the virtual path identifier/virtual channel identifier of the device at the terminal unit using a get-response message prescribed by the interim local management protocol; and assigning through the device at the network a virtual path identifier/virtual channel identifier to the device at the terminal unit based on the support range information about the virtual path identifier/virtual channel identifier provided in the get-response message from the device at the terminal unit.

6. The method according to claim 5, wherein said support range information about the virtual path identifier/virtual channel identifier of the device at the terminal unit refers to a message information base indicating a maximum bit length of the virtual path identifier and a message information base indicating a maximum bit length of the virtual channel identifier of a message information base to be managed and prescribed by the interim local management protocol.

7. The method according to claim 5 wherein said support range information about the virtual path identifier/virtual channel identifier of the device at the terminal unit refers to, of a message information base to be managed and prescribed by the interim local management protocol, a message information base indicating a maximum value of the virtual path identifier, a message information base indicating a minimum value of the virtual path identifier, a message information base indicating a maximum value of the virtual channel identifier, and a message information base indicating a minimum value of the virtual channel identifier.

8. A method for negotiating a connection identifier which identifies a connection set between a device at a terminal unit and a device at a network, comprising the steps of:

supporting an agent function of a simple network management protocol through the device at the terminal unit with the device at the network connected in a predetermined procedure to a manager device for supporting a management function of the simple network management protocol;

providing, from the device at the terminal unit to the manager device, support range information about a virtual path identifier/virtual channel identifier of the device at the terminal unit using a cold start trap message prescribed by the simple network management protocol when the device at the terminal unit is turned on;

providing, from the manager device to the device at the network, the support range information about the virtual path identifier/virtual channel identifier in the cold start trap message from the device at the terminal unit in the predetermined procedure; and assigning through the device at the network a virtual path identifier/virtual channel identifier to the device at the terminal unit based on the support range information about the virtual path identifier/virtual channel identifier provided from the manager device.

9. The method according to claim 8, wherein said support range information about the virtual path identifier/virtual channel identifier of the device at the terminal unit refers to a message information base indicating a maximum bit length of the virtual path identifier and a message information base indicating a maximum bit length of the virtual channel identifier of a message information base to be managed and prescribed by the simple network management protocol.

10. The method according to claim 8, wherein said support range information about the virtual path identifier/virtual channel identifier of the device at the terminal unit refers to, of a message information base to be managed and prescribed by the simple network management protocol, a message information base indicating a maximum value of the virtual path identifier, a message information base indicating a minimum value of the virtual path identifier, a message information base indicating a maximum value of the virtual channel identifier, and a message information base indicating a minimum value of the virtual channel identifier.

11. A method for negotiating a connection identifier which identifies a connection set between a device at a terminal unit and a device at a network, comprising the steps of:

supporting an agent function of a simple network management protocol through the device at the terminal unit with the device at the network connected in a predetermined procedure to a manager device for supporting a management function of the simple network management protocol;

providing, from the device at the terminal unit to the manager device, a cold start trap message prescribed by the interim local management protocol when the device at the terminal unit is turned on;

receiving the cold start trap message and transmitting, from the manager device to the device at the terminal unit, a get-request message, prescribed by the interim local management protocol, requesting support range information about a virtual path identifier/virtual channel identifier of the device at the terminal unit;

receiving the get-request message and providing, from the device at the terminal unit to the manager device, the support range information about the virtual path identifier/virtual channel identifier of the device at the terminal unit using a get-response message prescribed by the interim local management protocol;

providing from the manager device to the device at the network the support range information about the virtual path identifier/virtual channel identifier transmitted in the get-response message from the device at the terminal unit in the predetermined procedure; and assigning through the device at the network a virtual path identifier/virtual channel identifier to the device at the terminal unit based on the support range information about the virtual path identifier/virtual channel identifier provided from the manager device.

12. The method according to claim 11, wherein said support range information about the virtual path identifier/virtual channel identifier of the device at the terminal unit refers to a message information base indicating a maximum bit length of the virtual path identifier and a message information base indicating a maximum bit length of the virtual channel identifier of a message information base to be managed and prescribed by the simple network management protocol.

13. The method according to claim 11, wherein said support range information about the virtual path identifier/virtual channel identifier of the device at the terminal unit refers to, of a message information base to be managed and prescribed by the simple network management protocol, a message information base indicating a maximum value of the virtual path identifier, a message information base indicating a minimum value of the virtual path identifier, a message information base indicating a maximum value of the virtual channel identifier, and a message information base indicating a minimum value of the virtual channel identifier.

14. A device at a terminal unit for negotiating a connection identifier which identifies a connection set between the device at the terminal unit and a device at a network, comprising:

protocol terminating means for terminating a communication protocol for predetermined network management information supported by the device at the network; and support range information notifying means for notifying the device at the network of the support range information about a connection identifier of the device at the terminal unit through said protocol terminating means using a trap message prescribed by the communications protocol at a predetermined timing.

15. A device at a network for negotiating a connection identifier which identifies a connection set between the device at the network and a device at a terminal unit, comprising:

protocol terminating means for terminating a communication protocol for predetermined network management information supported by the device at the terminal unit; and connection identifier assigning means for assigning a connection identifier to the device at the terminal unit based on support range information about the connection identifier of the device at the terminal unit provided from the device at the terminal unit using a trap message prescribed by the communications protocol at a predetermine timing.

16. A method for negotiating by a device at a terminal unit with a device at a network for a connection identifier between the device at the terminal unit and the device at the network comprising the steps of:

specifying a value of the virtual channel identifier which the device at the terminal unit can not use; and notifying the device at the network of the specified value, thereby the device at the network decides a virtual path identifier and a virtual channel identifier between the device at the terminal unit and the device at the network.

* * * * *